United States Patent
Zhang et al.

(10) Patent No.: US 12,317,114 B2
(45) Date of Patent: May 27, 2025

(54) MOBILE NETWORK ENTITY CROSS LINK INTERFERENCE MEASUREMENT

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 17/941,440

(22) Filed: Sep. 9, 2022

(65) Prior Publication Data
US 2024/0089770 A1 Mar. 14, 2024

(51) Int. Cl.
*H04W 24/10* (2009.01)
(52) U.S. Cl.
CPC ................................ *H04W 24/10* (2013.01)
(58) Field of Classification Search
CPC ..................................................... H04W 24/10
See application file for complete search history.

(56) References Cited

U.S. PATENT DOCUMENTS

2017/0013655 A1* 1/2017 Martin ................ H04W 72/542
2024/0063992 A1* 2/2024 Esswie .............. H04W 72/1273
2024/0223343 A1* 7/2024 Fakoorian ............. H04W 24/08

FOREIGN PATENT DOCUMENTS

WO WO-2024033807 A1 * 2/2024 ........... H04B 1/1027

OTHER PUBLICATIONS

Intel Corporation, "UE-to-UE CLI measurement and reporting", 3GPP TSG RAN WG1 Ad-Hoc Meeting 1901, R1-1900489, Jan. 21,-Jan. 25, 2019, 5 pages (Year: 2019).*

* cited by examiner

*Primary Examiner* — Lan-Huong Truong
(74) *Attorney, Agent, or Firm* — Holland & Hart LLP

(57) ABSTRACT

Methods, systems, and devices for wireless communications are described. In one aspect, a first network entity may transmit a request for resources (e.g., periodic, aperiodic, or semi-persistent resources) to monitor for reference signals from a second network entity, and the first network entity may perform CLI measurements on the reference signals received on the resources from the second network entity. The first network entity or the second network entity may be a mobile network entity. The CLI measurements may be used to schedule communications at the first network entity or the second network entity. In another aspect, a first network entity may receive an indication of aperiodic resources to monitor for reference signals from a second network entity, and the first network entity may perform cross link interference (CLI) measurements on the reference signals received on the aperiodic resources from the second network entity.

25 Claims, 19 Drawing Sheets

MOBILE NETWORK ENTITY CROSS LINK INTERFERENCE MEASUREMENT

FIELD OF TECHNOLOGY

The following relates to wireless communications, including mobile network entity cross link interference measurement.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). In some wireless communications systems, communications at different network entities may interfere. For instance, communications between a first network entity and one or more UEs may interfere with communications between a second network entity and one or more UEs. Interference between network entities may be referred to as inter-network entity cross link interference (CLI). Improved techniques for minimizing inter-network entity CLI may be desirable.

SUMMARY

The described techniques relate to improved methods, systems, devices, and apparatuses that support mobile network entity cross link interference (CLI) measurement. In one aspect, a first network entity may transmit a request for resources (e.g., periodic, aperiodic, or semi-persistent resources) to monitor for reference signals from a second network entity, and the first network entity may perform CLI measurements on the reference signals received on the resources from the second network entity. The first network entity or the second network entity may be a mobile network entity. The CLI measurements may be used to schedule communications at the first network entity or the second network entity. In another aspect, a first network entity may receive an indication of aperiodic resources to monitor for reference signals from a second network entity, and the first network entity may perform CLI measurements on the reference signals received on the aperiodic resources from the second network entity.

A method for wireless communication at a first network entity is described. The method may include transmitting a request for resources for the first network entity to monitor for one or more first reference signals from a second network entity, the first network entity and the second network entity each configured to provide communications for one or more user equipment (UEs), monitoring for the one or more first reference signals on the resources in response to transmitting the request, performing interference measurement of the resources based on the monitoring, and transmitting a report of the interference measurement.

An apparatus for wireless communication at a first network entity is described. The apparatus may include a processor, memory coupled with the processor, and instructions stored in the memory. The instructions may be executable by the processor to cause the apparatus to transmit a request for resources for the first network entity to monitor for one or more first reference signals from a second network entity, the first network entity and the second network entity each configured to provide communications for one or more UEs, monitor for the one or more first reference signals on the resources in response to transmitting the request, perform interference measurement of the resources based on the monitoring, and transmit a report of the interference measurement.

Another apparatus for wireless communication at a first network entity is described. The apparatus may include means for transmitting a request for resources for the first network entity to monitor for one or more first reference signals from a second network entity, the first network entity and the second network entity each configured to provide communications for one or more UEs, means for monitoring for the one or more first reference signals on the resources in response to transmitting the request, means for performing interference measurement of the resources based on the monitoring, and means for transmitting a report of the interference measurement.

A non-transitory computer-readable medium storing code for wireless communication at a first network entity is described. The code may include instructions executable by a processor to transmit a request for resources for the first network entity to monitor for one or more first reference signals from a second network entity, the first network entity and the second network entity each configured to provide communications for one or more UEs, monitor for the one or more first reference signals on the resources in response to transmitting the request, perform interference measurement of the resources based on the monitoring, and transmit a report of the interference measurement.

In some examples of the method, apparatuses, and non-transitory computer-readable medium described herein, transmitting the request for resources may include operations, features, means, or instructions for transmitting a request for the second network entity to transmit the one or more first reference signals on the resources using a set of multiple beams.

In some examples of the method, apparatuses, and non-transitory computer-readable medium described herein, transmitting the request for resources may include operations, features, means, or instructions for transmitting a request for the second network entity to transmit the one or more first reference signals on the resources for reception at the first network entity using a set of multiple beams.

Some examples of the method, apparatuses, and non-transitory computer-readable medium described herein may further include operations, features, means, or instructions for receiving an indication of periodic resources to monitor for one or more second reference signals from the second network entity, receiving the one or more second reference signals on the periodic resources, and performing interference measurement on the one or more second reference signals.

Some examples of the method, apparatuses, and non-transitory computer-readable medium described herein may further include operations, features, means, or instructions for transmitting, in the request for resources and based on the interference measurement performed on the one or more second reference signals, an indication of one or more beams for the second network entity to use to transmit the one or more first reference signals.

Some examples of the method, apparatuses, and non-transitory computer-readable medium described herein may further include operations, features, means, or instructions for identifying the one or more beams based on the interference measurement performed on the one or more second reference signals transmitted on the one or more beams satisfying a threshold.

Some examples of the method, apparatuses, and non-transitory computer-readable medium described herein may further include operations, features, means, or instructions for receiving an indication to perform the interference measurement on the one or more second reference signals received on the periodic resources based on the second network entity being within a threshold distance of the first network entity, where performing the interference measurement may be based on receiving the indication.

Some examples of the method, apparatuses, and non-transitory computer-readable medium described herein may further include operations, features, means, or instructions for receiving an indication to avoid performing subsequent interference measurement on the one or more second reference signals received on the periodic resources based on the second network entity being outside a threshold distance of the first network entity.

Some examples of the method, apparatuses, and non-transitory computer-readable medium described herein may further include operations, features, means, or instructions for receiving an indication for the first network entity to switch from connecting to a first donor node to connecting to a second donor node based on the report of the interference measurement.

Some examples of the method, apparatuses, and non-transitory computer-readable medium described herein may further include operations, features, means, or instructions for receiving, from a third network entity, a control message scheduling communication at the first network entity based on the report of the interference measurement.

Some examples of the method, apparatuses, and non-transitory computer-readable medium described herein may further include operations, features, means, or instructions for scheduling communication at the first network entity based on the interference measurement.

In some examples of the method, apparatuses, and non-transitory computer-readable medium described herein, the first network entity includes a static network entity and the second network entity includes a mobile network entity, the first network entity includes a mobile network entity and the second network entity includes a static network entity, or the first network entity and the second network entity include mobile network entities.

In some examples of the method, apparatuses, and non-transitory computer-readable medium described herein, the resources requested by the first network entity includes periodic resources, aperiodic resources, or semi-persistent resources.

A method for wireless communication is described. The method may include receiving a request for resources for a first network entity to monitor for one or more first reference signals from a second network entity, the first network entity and the second network entity each configured to provide communications for one or more UEs, transmitting an indication of the resources for the first network entity to monitor for the one or more first reference signals from the second network entity, and receiving, based on transmitting the indication of the resources, a report of interference measurement performed by the first network entity on the one or more first reference signals.

An apparatus for wireless communication is described. The apparatus may include a processor, memory coupled with the processor, and instructions stored in the memory. The instructions may be executable by the processor to cause the apparatus to receive a request for resources for a first network entity to monitor for one or more first reference signals from a second network entity, the first network entity and the second network entity each configured to provide communications for one or more UEs, transmit an indication of the resources for the first network entity to monitor for the one or more first reference signals from the second network entity, and receive, based on transmitting the indication of the resources, a report of interference measurement performed by the first network entity on the one or more first reference signals.

Another apparatus for wireless communication is described. The apparatus may include means for receiving a request for resources for a first network entity to monitor for one or more first reference signals from a second network entity, the first network entity and the second network entity each configured to provide communications for one or more UEs, means for transmitting an indication of the resources for the first network entity to monitor for the one or more first reference signals from the second network entity, and means for receiving, based on transmitting the indication of the resources, a report of interference measurement performed by the first network entity on the one or more first reference signals.

A non-transitory computer-readable medium storing code for wireless communication is described. The code may include instructions executable by a processor to receive a request for resources for a first network entity to monitor for one or more first reference signals from a second network entity, the first network entity and the second network entity each configured to provide communications for one or more UEs, transmit an indication of the resources for the first network entity to monitor for the one or more first reference signals from the second network entity, and receive, based on transmitting the indication of the resources, a report of interference measurement performed by the first network entity on the one or more first reference signals.

In some examples of the method, apparatuses, and non-transitory computer-readable medium described herein, receiving the request for resources may include operations, features, means, or instructions for receiving a request for the second network entity to transmit the one or more first reference signals on the resources using a set of multiple beams.

In some examples of the method, apparatuses, and non-transitory computer-readable medium described herein, receiving the request for resources may include operations, features, means, or instructions for receiving a request for the second network entity to transmit the one or more first reference signals on the resources for reception at the first network entity using a set of multiple beams.

Some examples of the method, apparatuses, and non-transitory computer-readable medium described herein may further include operations, features, means, or instructions for transmitting an indication of periodic resources for the first network entity to monitor for one or more second reference signals from the second network entity and receiving, based on transmitting the indication of periodic resources, a second report of interference measurement performed by the first network entity on the one or more second reference signals.

Some examples of the method, apparatuses, and non-transitory computer-readable medium described herein may further include operations, features, means, or instructions for receiving, in the request for resources and based on the interference measurement performed on the one or more second reference signals, an indication of one or more beams for the second network entity to use to transmit the one or more first reference signals.

Some examples of the method, apparatuses, and non-transitory computer-readable medium described herein may further include operations, features, means, or instructions for transmitting an indication for the first network entity to switch from connecting to a first donor node to connecting to a second donor node based on the report of the interference measurement.

Some examples of the method, apparatuses, and non-transitory computer-readable medium described herein may further include operations, features, means, or instructions for transmitting a control message scheduling communication at the first network entity based on the report of the interference measurement.

Some examples of the method, apparatuses, and non-transitory computer-readable medium described herein may further include operations, features, means, or instructions for scheduling communication at another network entity based on the interference measurement.

In some examples of the method, apparatuses, and non-transitory computer-readable medium described herein, the first network entity includes a static network entity and the second network entity includes a mobile network entity, the first network entity includes a mobile network entity and the second network entity includes a static network entity, or the first network entity and the second network entity include mobile network entities.

In some examples of the method, apparatuses, and non-transitory computer-readable medium described herein, the resources requested by the first network entity includes periodic resources, aperiodic resources, or semi-persistent resources.

A method for wireless communication at a first network entity is described. The method may include receiving an indication of aperiodic resources for the first network entity to monitor for one or more reference signals from a second network entity, the first network entity and the second network entity each configured to provide communications for one or more user equipment (UEs), monitoring for the one or more reference signals on the aperiodic resources, performing interference measurement of the aperiodic resources based on the monitoring, and transmitting a report of the interference measurement.

An apparatus for wireless communication at a first network entity is described. The apparatus may include a processor, memory coupled with the processor, and instructions stored in the memory. The instructions may be executable by the processor to cause the apparatus to receive an indication of aperiodic resources for the first network entity to monitor for one or more reference signals from a second network entity, the first network entity and the second network entity each configured to provide communications for one or more user equipment (UEs), monitor for the one or more reference signals on the aperiodic resources, perform interference measurement of the aperiodic resources based on the monitoring, and transmit a report of the interference measurement.

Another apparatus for wireless communication at a first network entity is described. The apparatus may include means for receiving an indication of aperiodic resources for the first network entity to monitor for one or more reference signals from a second network entity, the first network entity and the second network entity each configured to provide communications for one or more user equipment (UEs), means for monitoring for the one or more reference signals on the aperiodic resources, means for performing interference measurement of the aperiodic resources based on the monitoring, and means for transmitting a report of the interference measurement.

A non-transitory computer-readable medium storing code for wireless communication at a first network entity is described. The code may include instructions executable by a processor to receive an indication of aperiodic resources for the first network entity to monitor for one or more reference signals from a second network entity, the first network entity and the second network entity each configured to provide communications for one or more user equipment (UEs), monitor for the one or more reference signals on the aperiodic resources, perform interference measurement of the aperiodic resources based on the monitoring, and transmit a report of the interference measurement.

Some examples of the method, apparatuses, and non-transitory computer-readable medium described herein may further include operations, features, means, or instructions for receiving, from a third network entity, a control message scheduling communication at the first network entity based on the report of the interference measurement.

Some examples of the method, apparatuses, and non-transitory computer-readable medium described herein may further include operations, features, means, or instructions for scheduling communication at the first network entity based on the interference measurement.

A method for wireless communication is described. The method may include transmitting an indication of aperiodic resources for a first network entity to monitor for one or more reference signals from a second network entity, the first network entity and the second network entity each configured to provide communications for one or more UEs, receiving a report of interference measurement performed by the first network entity on the one or more reference signals received from the second network entity, and scheduling communication at the first network entity or another network entity based on the report of the interference measurement.

An apparatus for wireless communication is described. The apparatus may include a processor, memory coupled with the processor, and instructions stored in the memory. The instructions may be executable by the processor to cause the apparatus to transmit an indication of aperiodic resources for a first network entity to monitor for one or more reference signals from a second network entity, the first network entity and the second network entity each configured to provide communications for one or more UEs, receive a report of interference measurement performed by the first network entity on the one or more reference signals received from the second network entity, and schedule communication at the first network entity or another network entity based on the report of the interference measurement.

Another apparatus for wireless communication is described. The apparatus may include means for transmitting an indication of aperiodic resources for a first network entity to monitor for one or more reference signals from a second network entity, the first network entity and the second network entity each configured to provide communications for one or more UEs, means for receiving a report of interference measurement performed by the first network entity on the one or more reference signals received from the second network entity, and means for scheduling communication at the first network entity or another network entity based on the report of the interference measurement.

A non-transitory computer-readable medium storing code for wireless communication is described. The code may include instructions executable by a processor to transmit an indication of aperiodic resources for a first network entity to monitor for one or more reference signals from a second network entity, the first network entity and the second network entity each configured to provide communications for one or more UEs, receive a report of interference measurement performed by the first network entity on the one or more reference signals received from the second network entity, and schedule communication at the first network entity or another network entity based on the report of the interference measurement.

DETAILED DESCRIPTION

Figure 1:
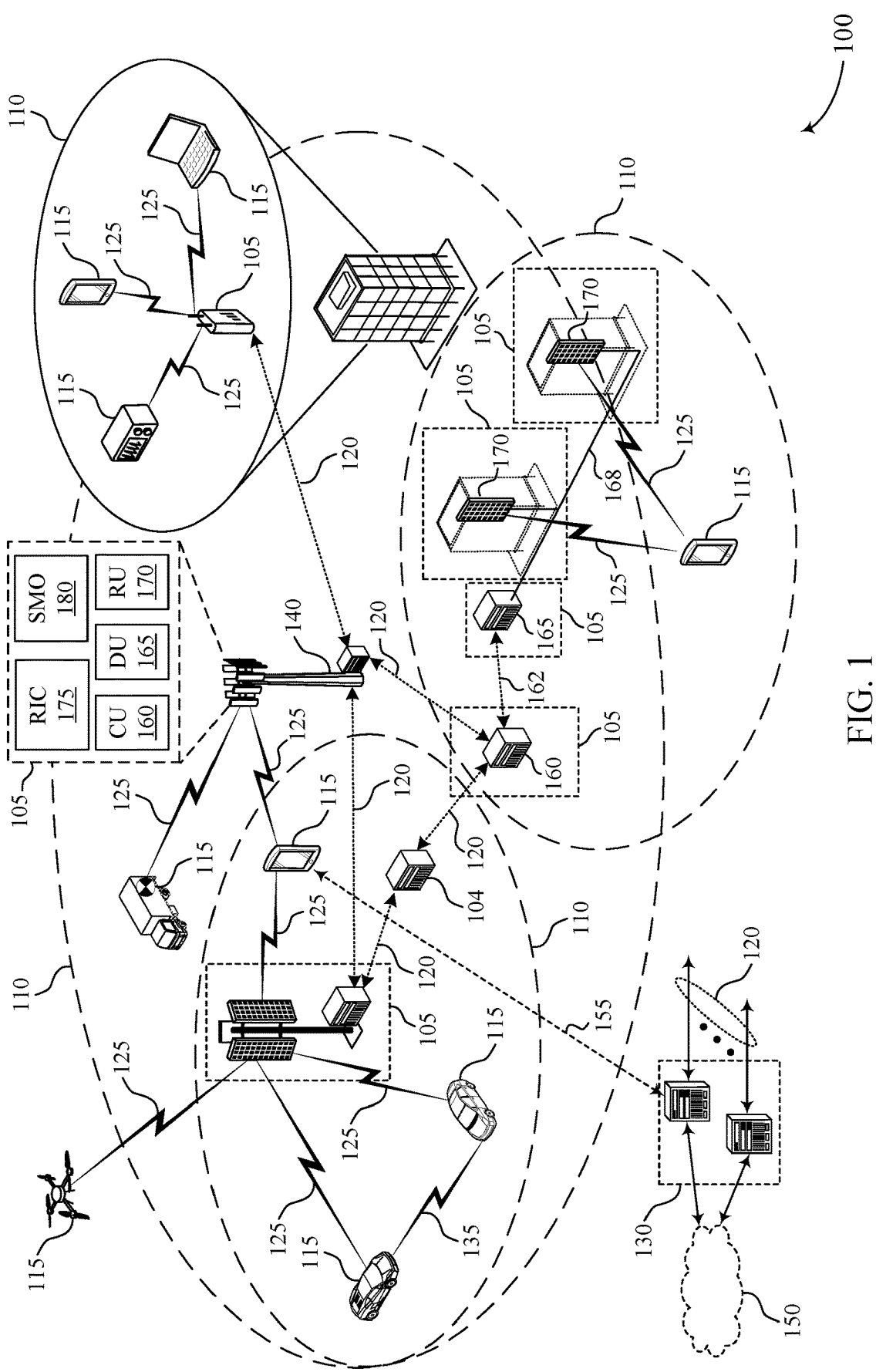
FIG. 1 illustrates an example of a wireless communications system that supports mobile network entity cross link interference (CLI) measurement in accordance with one or more aspects of the present disclosure.

In some wireless communications systems, communications at different network entities may interfere. For instance, communications between a first network entity and one or more user equipment (UEs) may interfere with communications between a second network entity and one or more UEs. In such systems, it may be appropriate for network entities to support techniques to mitigate inter-network entity (or inter-base station) cross link interference (CLI). In some cases, however, one or more network entities in a wireless communications system may be mobile, and the positions of these mobile network entities may change over time. As such, techniques for statically configuring resources for CLI measurements may be deficient. For instance, if a mobile network entity is configured to monitor fixed resources for reference signals from a static network entity and perform CLI measurements on the reference signals (e.g., or vice versa), the CLI measurements may not be useful if the mobile network entity and the other network entity are far apart.

As described herein, a wireless communications system may support efficient techniques for configuring resources for CLI measurements at a network entity. The network entity may be a mobile network entity experiencing interference from a static network entity, a static network entity experiencing interference from a mobile network entity, or a mobile network entity experiencing interference from another mobile network entity. A mobile network entity may refer to a network entity capable of moving or changing locations (e.g., a network entity whose geo-position varies), and a static network entity may refer to a network entity that is not mobile (e.g., a network entity whose geo-position is fixed).

In one aspect, a first network entity may transmit a request for resources (e.g., periodic, aperiodic, or semi-persistent resources) to monitor for reference signals from a second network entity, and the first network entity may perform CLI measurements on the reference signals received on the resources from the second network entity. The first network entity or the second network entity may be a mobile network entity. In some cases, the first network entity may report the CLI measurements, and a third network entity may schedule communications at the first network entity based on the CLI measurements. In other cases, the first network entity may schedule communications at the first network entity based on the CLI measurements. In another aspect, a first network entity may receive an indication of aperiodic resources to monitor for reference signals from a second network entity, and the first network entity may perform CLI measurements on the reference signals received on the aperiodic resources from the second network entity.

Aspects of the disclosure are initially described in the context of wireless communications systems. Aspects of the disclosure are further illustrated by and described with reference to apparatus diagrams, system diagrams, and flowcharts that relate to mobile network entity CLI measurement.

FIG. 1 illustrates an example of a wireless communications system 100 that supports mobile network entity CLI measurement in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support mobile network entity CLI measurement as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, MC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The wireless communications system 100 may support efficient techniques for facilitating CLI measurements at a network entity 105. The network entity 105 may be a mobile network entity 105 experiencing interference from a static network entity 105, a static network entity 105 experiencing interference from a mobile network entity 105, or a mobile network entity 105 experiencing interference from another mobile network entity 105. A mobile network entity 105 may refer to a network entity 105 capable of moving or changing locations (e.g., a network entity whose geo-position varies), and a static network entity 105 may refer to a network entity 105 that is not mobile (e.g., a network entity whose geo-position is fixed). In one aspect, the described techniques provide for requesting resources for a first network entity 105 to monitor for reference signals from a second network entity 105. In another aspect, the described techniques provide for configuring aperiodic resources for a first network entity 105 to monitor for reference signals from a second network entity 105. In either aspect, the first network entity 105 may perform CLI measurements on the reference signals received from the second network entity 105, and the CLI measurements may be used to schedule communications at the first network entity 105 or the second network entity 105.

Figure 2:
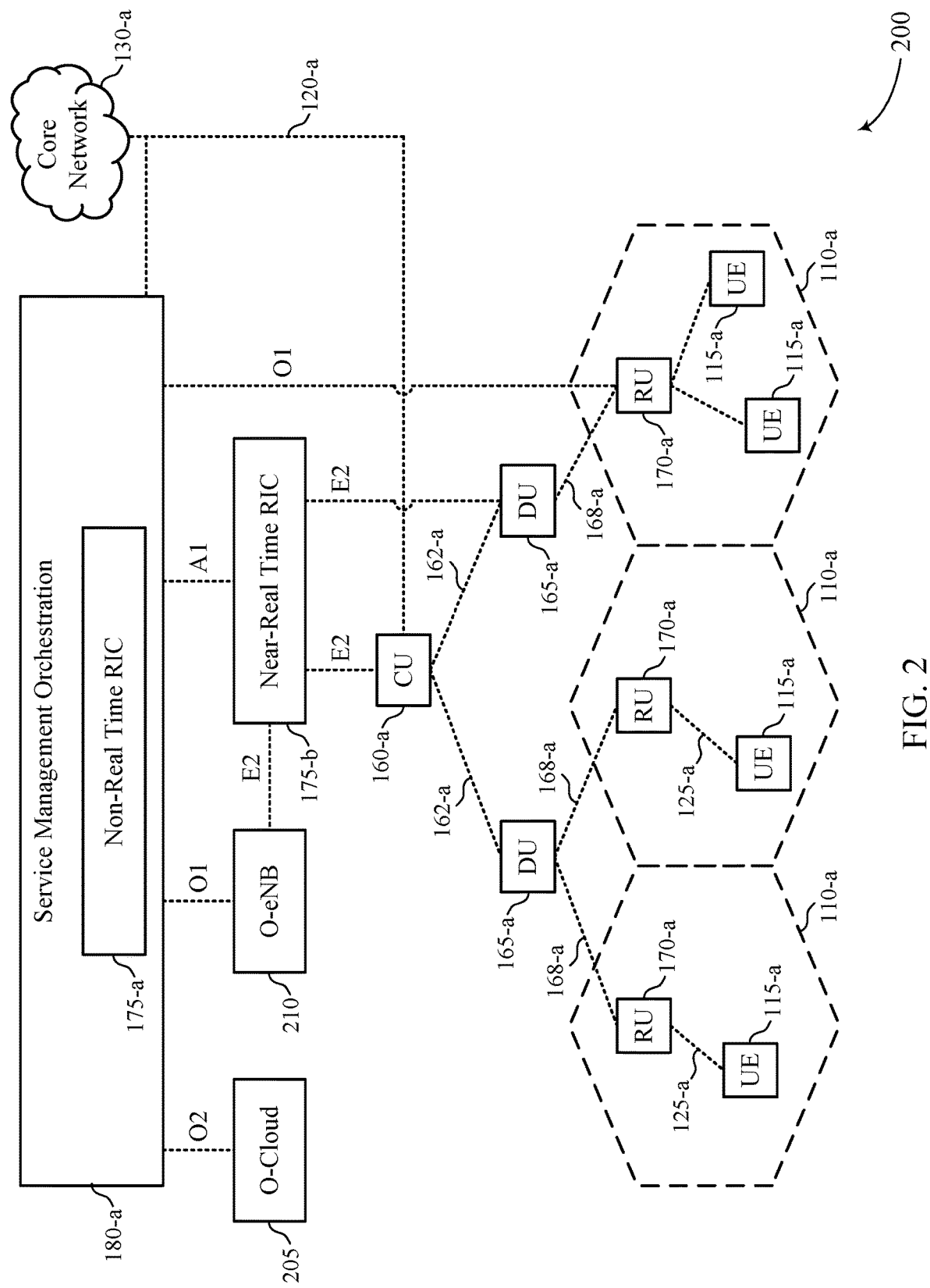
FIG. 2 illustrates an example of a network architecture that supports mobile network entity CLI measurement in accordance with one or more aspects of the present disclosure.

FIG. 2 illustrates an example of a network architecture 200 (e.g., a disaggregated base station architecture, a disaggregated RAN architecture) that supports mobile network entity CLI measurement in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (e.g., base station functions, RAN functions) to control the operation of one or more RUs 170-a. In some examples, a DU 165-a may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage requirements which may be managed via an operations and maintenance interface (e.g., an O1 interface). For virtualized network entities 105, the SMO 180-a may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-a, DUs 165-a, RUs 170-a, and Near-RT RICs 175-b. In some implementations, the SMO 180-a may communicate with components configured in accordance with a 4G RAN (e.g., via an O1 interface). Additionally, or alternatively, in some implementations, the SMO 180-a may communicate directly with one or more RUs 170-a via an O1 interface. The SMO 180-a also may include a Non-RT RIC 175-a configured to support functionality of the SMO 180-a.

The Non-RT RIC 175-a may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-b. The Non-RT RIC 175-a may be coupled to or communicate with (e.g., via an A1 interface) the Near-RT RIC 175-b. The Near-RT RIC 175-b may be configured to include a logical function that enables near-real-time control and optimization of RAN elements and resources via data collection and actions over an interface (e.g., via an E2 interface) connecting one or more CUs 160-a, one or more DUs 165-a, or both, as well as an O-eNB 210, with the Near-RT RIC 175-b.

In some examples, to generate AI/ML models to be deployed in the Near-RT RIC 175-b, the Non-RT RIC 175-a may receive parameters or external enrichment information from external servers. Such information may be utilized by the Near-RT RIC 175-b and may be received at the SMO 180-a or the Non-RT RIC 175-a from non-network data sources or from network functions. In some examples, the Non-RT RIC 175-a or the Near-RT RIC 175-b may be configured to tune RAN behavior or performance. For example, the Non-RT RIC 175-a may monitor long-term trends and patterns for performance and employ AI or ML models to perform corrective actions through the SMO 180-a (e.g., reconfiguration via O1) or via generation of RAN management policies (e.g., A1 policies).

The network architecture 200 may support efficient techniques for facilitating CLI measurements at a network entity 105. The network entity 105 may be a mobile network entity 105 experiencing interference from a static network entity 105, a static network entity 105 experiencing interference from a mobile network entity 105, or a mobile network entity 105 experiencing interference from another mobile network entity 105. A mobile network entity 105 may refer to a network entity 105 capable of moving or changing locations (e.g., a network entity whose geo-position varies), and a static network entity 105 may refer to a network entity 105 that is not mobile (e.g., a network entity whose geo-position is fixed). In one aspect, the described techniques provide for requesting resources for a first network entity 105 to monitor for reference signals from a second network entity 105. In another aspect, the described techniques provide for configuring aperiodic resources for a first network entity 105 to monitor for reference signals from a second network entity 105. In either aspect, the first network entity 105 may perform CLI measurements on the reference signals received from the second network entity 105, and the CLI measurements may be used to schedule communications at the first network entity 105 or the second network entity 105.

Some UEs 115 or network entities 105 in wireless communications system 100 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the network entities 105 or UEs 115 include entering a power saving deep sleep mode when not engaging in active communications, operating over a limited bandwidth (e.g., according to narrowband communications), or a combination of these techniques. For example, some network entities 105 or UEs 115 may be configured for operation using a narrowband protocol type that is associated with a defined portion or range (e.g., set of subcarriers or resource blocks (RBs)) within a carrier, within a guard-band of a carrier, or outside of a carrier.

In addition to, or as an alternative to, a half-duplex mode, some network entities 105 or UEs 115 may support a full-duplex mode. A full-duplex mode may refer to a mode that supports two-way communication via simultaneous transmission and reception. This two-way communication may be referred to as full-duplex communications. Full-duplex communications is a technique which is capable of theoretically doubling link capacity by enabling radio network nodes to transmit and receive simultaneously on the same frequency and time resource. Full-duplex breaks half-duplex operation constraints where transmission and reception either differ in time or in frequency. A full-duplex network node, such as a network entity 105, UE 115, or both in the cellular network, can communicate simultaneously in uplink and downlink with two half-duplex panels using the same radio resources. For instance, a UE 115 may transmit uplink transmissions from one panel at the UE 115, and the UE 115 may receive downlink transmissions at another panel at the UE 115. Similarly, a network entity 105 may receive uplink transmissions at one panel at the network entity 105, and the network entity 105 may transmit downlink transmissions from another panel at the network entity 105.

Thus, a device equipped with multiple TRPs that supports the capability of simultaneous transmission and reception using the same time-frequency radio resource (e.g., uplink or downlink transmissions in frequency range 2 (FR2) and different associated aspects of procedures) may be referred to as a full-duplex capable device (e.g., full-duplex UE 115 or full-duplex network entity 105). The device may also be capable of working in both the full-duplex mode and backing off to a half-duplex mode. In some cases, a full-duplex capability may be conditional on beam separation and other factors (e.g., self-interference between downlink and uplink and clutter echo at a device). However, full-duplex communications may provide for latency reduction (e.g., since it may be possible to receive a downlink signal in an uplink-only slot, which may enable latency savings), spectrum efficiency enhancement (e.g., per cell or per UE 115), more efficient resource utilization, and coverage enhancements with continuous uplink or downlink transmissions or repetitions.

Figure 3:
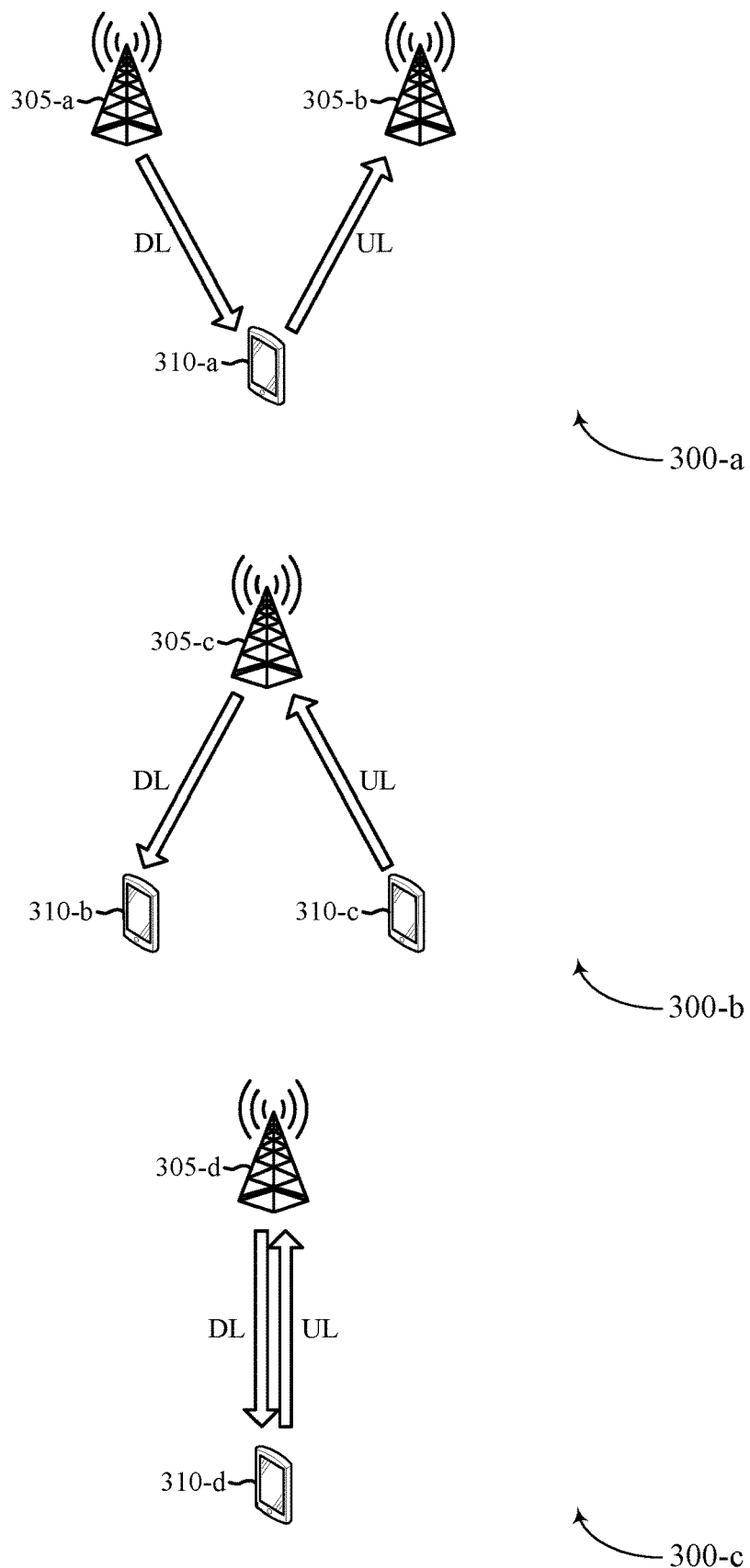
FIG. 3 illustrates examples of full-duplex communications in accordance with one or more aspects of the present disclosure.

FIG. 3 illustrates examples of full-duplex communications 300 in accordance with one or more aspects of the present disclosure. In a first example 300-*a*, a UE 310-*a* may support full-duplex communications (e.g., operate in a full-duplex mode), and the UE 310-*a* may receive downlink signals from a first network entity 305-*a* (e.g., cell or TRP) and transmit uplink signals to a second network entity 305-*b*. The first example 300-*a* may be an example of multi-TRP communications. In a second example 300-*b*, a network entity 305-*c* may support full-duplex communications (e.g., operate in a full-duplex mode), and the network entity 305-*c* may transmit downlink signals to a first UE 310-*b* and receive uplink signals from a second UE 310-*c*. In a third example 300-*c*, a network entity 305-*d* and a UE 310-*d* may each support full-duplex communications (e.g., operate in a full-duplex mode). The network entity 305-*d* may transmit downlink signals to the UE 310-*d* and receive uplink signals from the UE 310-*d*, and the UE 310-*d* may receive downlink signals from the network entity 305-*d* and transmit uplink signals to the network entity 305-*d*.

Figure 4:
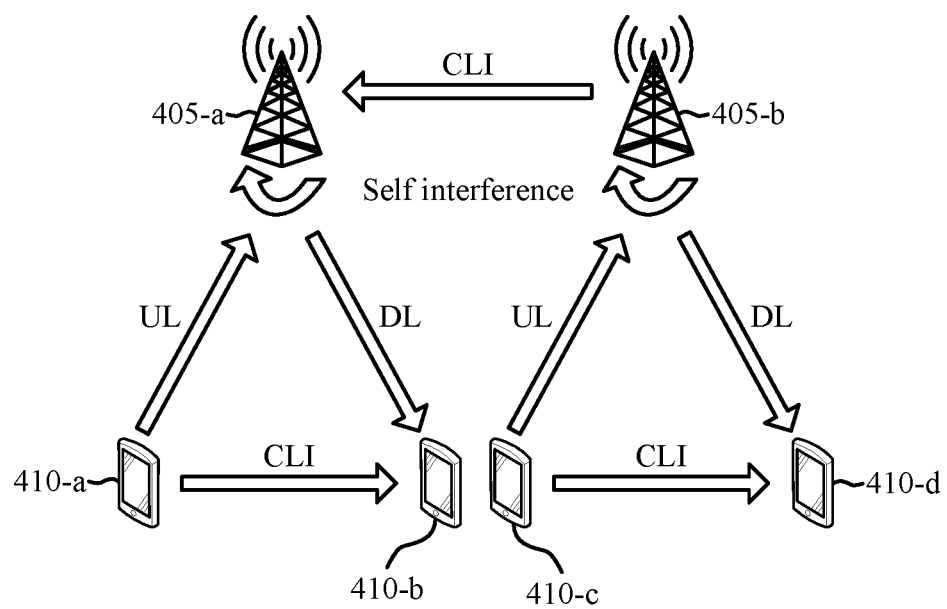
FIG. 4 illustrates an example of full-duplex operation at a first network entity and a second network entity and half-duplex operation at a first user equipment (UE) and a second UE in accordance with one or more aspects of the present disclosure.

FIG. 4 illustrates an example of full-duplex operation 400 at a first network entity 405-*a* and a second network entity 405-*b* and half-duplex operation at a first UE 410-*a*, a second UE 410-*b*, a third UE 410-*c*, and a fourth UE 410-*d* in accordance with one or more aspects of the present disclosure. The first network entity 405-*a* may receive uplink transmissions from the first UE 410-*a* and transmit downlink transmissions to the second UE 410-*b*. Similarly, the second network entity 405-*b* may receive uplink transmissions from the third UE 410-*c* and transmit downlink transmissions to the fourth UE 410-*d*. The second UE 410-*b* may experience CLI from the uplink transmissions from the first UE 410-*a*, and the fourth UE 410-*d* may experience CLI from the uplink transmissions from the third UE 410-*c*. In addition, the first network entity 405-*a* may experience CLI from the second network entity 405-*b*. The first network entity 405-*a* may experience self-interference from full-duplex operation since the first network entity 405-*a* may simultaneously receive uplink transmissions from the first UE 410-*a* and transmit downlink transmissions to the second UE 410-*b*. Similarly, the second network entity 405-*b* may experience self-interference from full-duplex operation since the second network entity 405-*b* may simultaneously receive uplink transmissions from the third UE 410-*c* and transmit downlink transmissions to the fourth UE 410-*d*.

Figure 5:
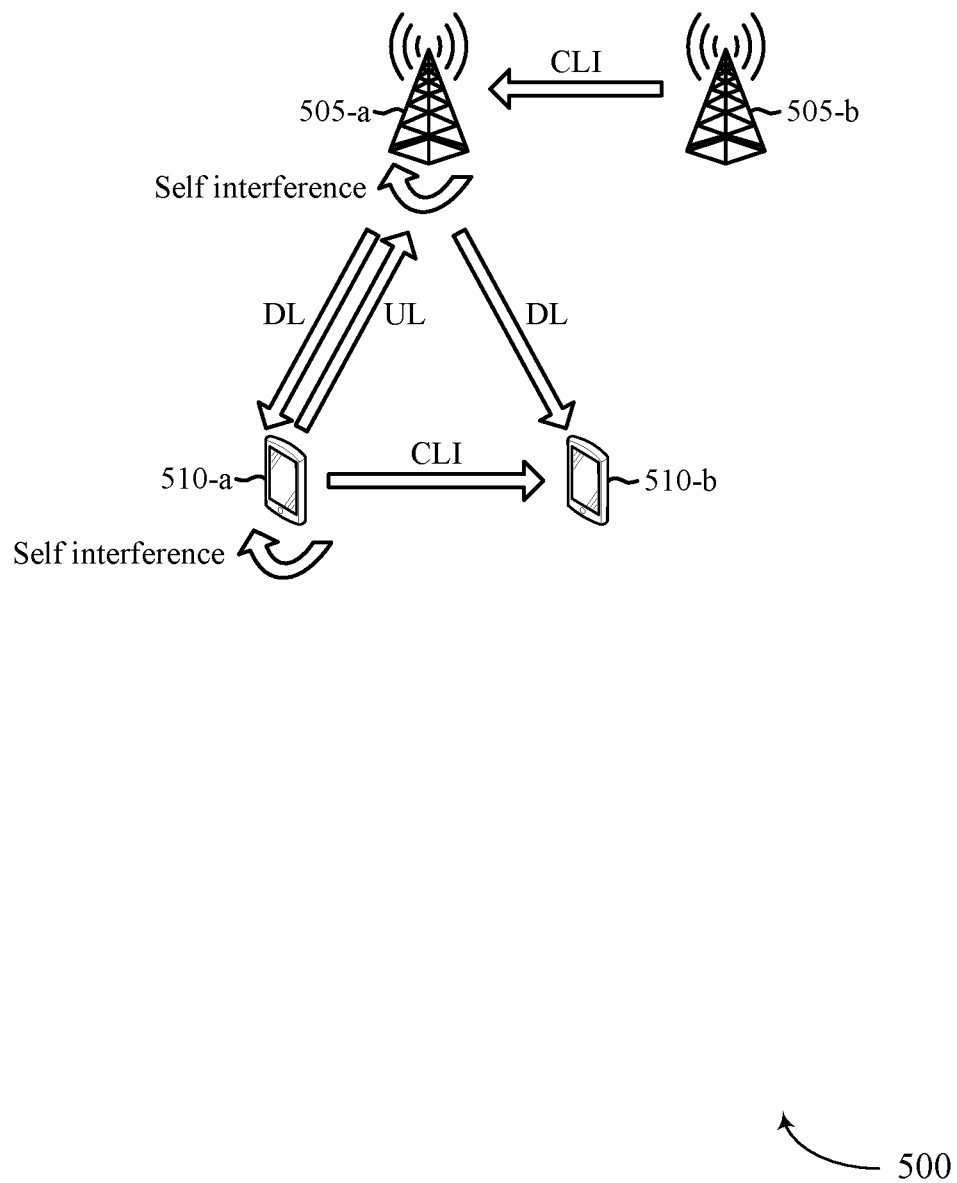
FIG. 5 illustrates an example of full-duplex operation at a first network entity and a first UE in accordance with one or more aspects of the present disclosure.

FIG. 5 illustrates an example of full-duplex operation 500 at a first network entity 505-*a* and a first UE 510-*a* (e.g., a customer premises equipment (CPE)) in accordance with one or more aspects of the present disclosure. The first network entity 505-*a* may communicate with the first UE 510-*a* and the second UE 510-*b* with partially overlapping uplink and downlink transmissions. The second UE 510-*b* may experience CLI from the uplink transmissions from the first UE 510-*a*, and the first network entity 505-*a* may experience CLI from a second network entity 505-*b*. The first network entity 505-*a* may also experience self-interference from full-duplex operation since the first network entity 505-*a* may simultaneously receive uplink transmissions from the first UE 510-*a* and transmit downlink transmissions to the first UE 510-*a* and the second UE 510-*b*. The first UE 510-*a* may also experience self-interference from full-duplex operation since the first UE 510-*a* may simultaneously receive downlink transmissions from the first network entity 505-*a* and transmit uplink transmissions to the first network entity 505-*a*.

Figure 6:
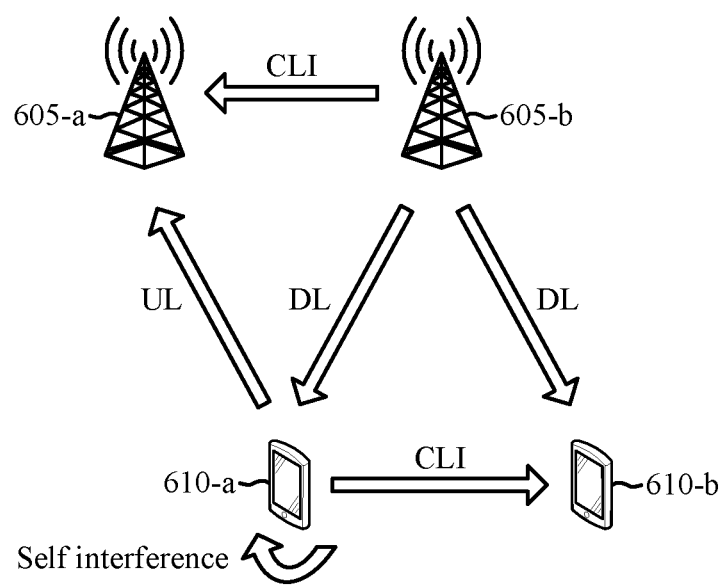
FIG. 6 illustrates an example of full-duplex operation at a first UE and half-duplex operation at a first network entity and a second network entity in accordance with one or more aspects of the present disclosure.

FIG. 6 illustrates an example of full-duplex operation 600 at a first UE 610-*a* and half-duplex operation at a first network entity 605-*a* and a second network entity 605-*b* in accordance with one or more aspects of the present disclosure. The first network entity 605-*a* may receive uplink transmissions from the first UE 610-*a*, and the second network entity 605-*b* may transmit downlink transmissions to the first UE 610-*a* and the second UE 610-*b* (e.g., multi-TRP). A second UE 610-*b* may experience CLI from uplink transmissions from the first UE 610-*a*, and the first network entity 605-*a* may experience CLI from downlink transmissions from the second network entity 605-*b*. The first UE 610-*a* may experience self-interference from full-duplex operation since the first UE 610-*a* may simultaneously receive downlink transmissions from the second network entity 605-*b* and transmit uplink transmissions to the first network entity 605-*a*.

Figure 7:
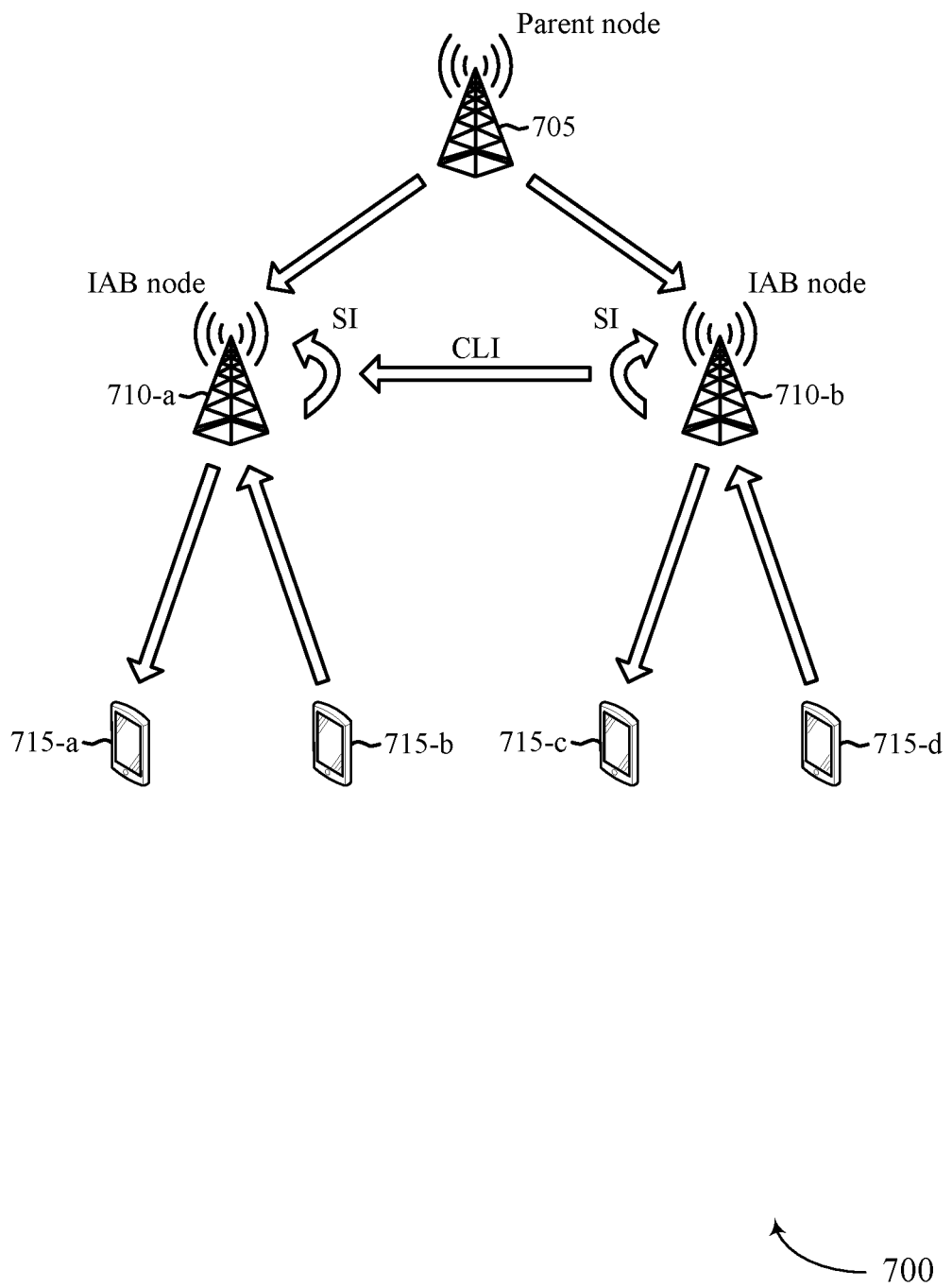
FIG. 7 illustrates an example of full-duplex operation at a first integrated access backhaul (IAB) node and a second IAB node in accordance with one or more aspects of the present disclosure.

FIG. 7 illustrates an example of full-duplex operation 700 at a first TAB node 710-*a* and a second TAB node 710-*b* (e.g., enhanced duplexing capability) in accordance with one or more aspects of the present disclosure. The first TAB node 710-*a* and the second TAB node 710-*b* may share a parent node 705 (e.g., IAB donor node). The first IAB node 710-*a* may transmit downlink transmissions to a first UE 715-*a* and receive uplink transmissions from a second UE 715-*b*. The second TAB node 710-*b* may transmit downlink transmissions to a third UE 715-*c* and receive uplink transmissions from a fourth UE 715-*d*. The first TAB node 710-*a* may experience CLI from downlink transmissions from the second TAB node 710-*b*. The first TAB node 710-*a* may also experience self-interference from full-duplex operation since the first TAB node 710-*a* may simultaneously transmit downlink transmissions to the first UE 715-*a* and receive uplink transmissions from the second UE 715-*b*. Similarly, the second TAB node 710-*b* may experience self-interference from full-duplex operation since the second TAB node 710-*b* may simultaneously transmit downlink transmissions to the third UE 715-*c* and receive uplink transmissions from the fourth UE 715-*d*. In some cases, the first TAB node 710-*a* and the second TAB node 710-*b* may both support single frequency full-duplex (SFFD) and FDM or spatial division multiplexing (SDM) with resource block group (RBG) granularity.

The examples described with reference to FIGS. 4-7 may be implemented in the wireless communications system 100 or the network architecture 200. Thus, the wireless communications system 100 or the network architecture 200 may include UEs 115 and network entities 105 capable of operating in a half-duplex mode, a full-duplex mode, or both. In some cases, it may be challenging to coordinate communications between the UEs 115 and the network entities 105. The wireless communications system 100 and the network architecture 200 may support efficient techniques for coordinating communications between UEs 115 and network entities 105 supporting a half-duplex mode, a full-duplex mode, or both. For instance, network entities 105 in the wireless communications system 100 or the network architecture 200 may perform CLI measurements and reporting, and the network entities 105 may use the CLI measurements to schedule communications with one or more UEs 115.

Figure 8:
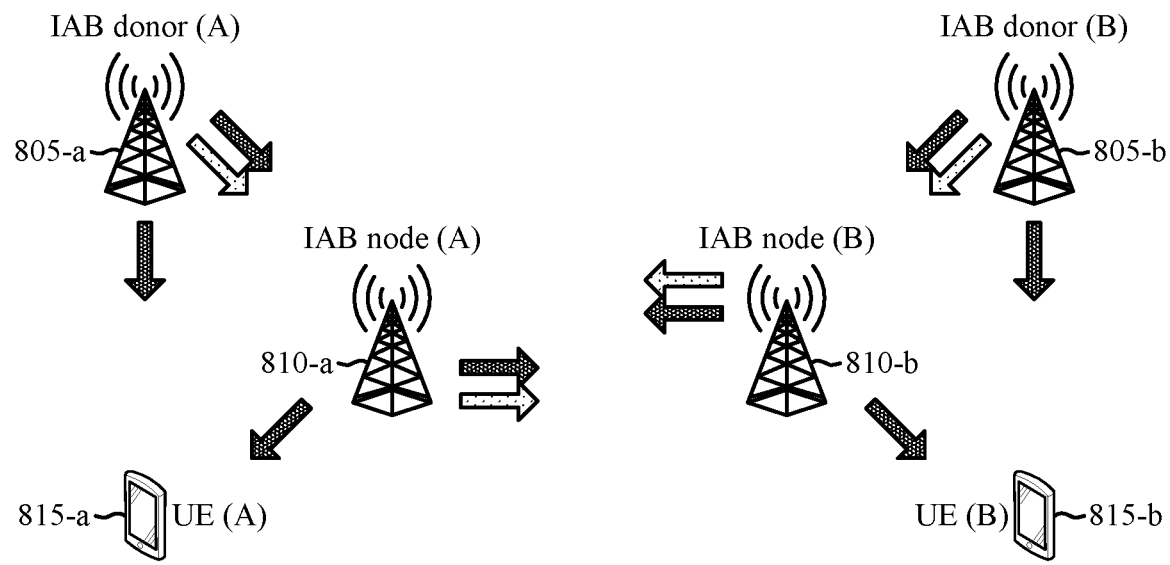
FIG. 8 illustrates an example of reference signal transmissions for CLI measurements or cell access in accordance with one or more aspects of the present disclosure.

FIG. 8 illustrates an example of reference signal (RS) (e.g., synchronization signal block (SSB)) transmissions 800 for cell detection, CLI measurements, cell access in accordance with one or more aspects of the present disclosure. To facilitate CLI measurements, a first network entity 105 may be configured to transmit reference signals for the CLI measurements, and a second network entity 105 may be configured to receive the reference signals and perform the CLI measurements on the reference signals. A configuration for transmitting reference signals for CLI measurements may be referred to as an SSB transmission configuration (STC), and a configuration for receiving reference signals and performing CLI measurements on the reference signals may be referred to as an SSB-based measurement timing configuration (SMTC).

STC and SMTC may be configured in TDM at an IAB-DU and IAB-MT, respectively, for a half-duplex constraint. The STC and SMTC configurations may be supported in a centralized scheme, where SSB transmissions are coordinated by a CU. Such a centralized scheme may be challenging to implement for a dense cell deployment, since the CU may TDM SSB transmissions from cells in a large area without initially being able to determine which cells are within range. An STC configuration may indicate an SSB center frequency, an SSB subcarrier spacing, an SSB transmission periodicity, an SSB transmission timing offset in half frame(s), an index of SSBs to transmit, and a physical cell ID. An SMTC configuration may indicate a window periodicity, a window timing offset, a window duration, a list of physical IDs to be measured, and SSBs to be measured.

IAB STC may be configured at an IAB-DU or an IAB-donor-DU for CLI measurements at neighbor IAB-MTs. IAB STC reference signals may be different from reference signals for UE initial access. An information element (IE) containing an STC for a cell may be included in IAB STC information. The IAB STC information may include information for an IAB-DU or an IAB-donor-DU. The information may be used by neighbor IAB-MTs for discovery and measurements of reference signals from the IAB-DU or IAB-donor DU. A maximum number of STC configurations (e.g., five) may be defined for an IAB-DU, where the STC configurations include one STC configuration for initial access and four STC configurations for backhaul (e.g., CLI measurements). STC information may be sent by an IAB-donor-CU to an IAB-DU or IAB-donor-DU via an F1 interface (e.g., message flow: IAB information IAB-donor-CU to IAB STC information). Additionally, or alternatively, STC information may be sent by an IAB-DU or IAB-donor-DU to an IAB-donor-CU (e.g., message flow: F1 setup request to served cell information to IAB information IAB-DU to IAB STC information).

In the example of FIG. 8, IAB donors 805 and IAB nodes 810 may receive STCs configuring the IAB donors 805 and the IAB nodes 810 to transmit reference signals, and IAB nodes 810 and the UEs 815 may receive SMTCs configuring the IAB nodes 810 and the UEs 815 to receive reference signals. Reference signals 820 for UEs 815 may be for initial access (e.g., for accessing UEs), and reference signals 825 for IAB nodes may be for IAB node detection and measurement (e.g., with up to four transmission times configurable). An IAB node 810 may receive the reference signals 825 and may perform CLI measurements on the reference signals 825 (e.g., if the reference signals are received from another IAB node 810) or perform detection using the reference signals 825 (e.g., if the reference signals 825 are received from an IAB donor node 805).

An IAB donor-DU 805-*a* and an IAB donor-DU 805-*b* may transmit (e.g., in accordance with STCs for IAB-donor-DU SSB transmissions) reference signals 820 for UEs 815 and reference signals 825 for IAB nodes 810. An IAB-MT at the IAB node 810-*a* and an IAB-MT at the IAB node 810-*b* may monitor (e.g., in accordance with SMTCs) configured resources for the reference signals 825 from the IAB-donor-DU 805-*a* and the IAB-donor-DU 805-*b*, respectively. A UE 815-*a* and a UE 815-*b* may also monitor (e.g., in accordance with SMTCs) configured resources for the reference signals 820 from the IAB-donor-DU 805-*a* and the IAB-donor-DU 805-*b*, respectively.

An IAB-DU at the IAB node 810-*a* may transmit reference signals 820 for UEs 815 and reference signals 825 for IAB nodes 810. An IAB-MT at the IAB node 810-*b* may monitor (e.g., in accordance with an SMTC) configured resources for the reference signals 825 from the IAB-DU at the IAB node 810-*a*, and a UE 815-*a* may monitor (e.g., in accordance with an SMTC) configured resources for the reference signals 820 from the IAB-DU at the IAB node

810-*a*. Similarly, an IAB-DU at the IAB node 810-*b* may transmit reference signals 820 for UEs 815 and reference signals 825 for IAB nodes 810. An IAB-MT at the IAB node 810-*a* may monitor (e.g., in accordance with an SMTC) configured resources for the reference signals 825 from the IAB-DU at the IAB node 810-*b*, and a UE 815-*b* may monitor (e.g., in accordance with an SMTC) configured resources for the reference signals 820 from the IAB-DU at the IAB node 810-*b*.

The IAB nodes 810 may be static in the example of FIG. 8. The STCs and SMTCs may configure the IAB nodes 810 with fixed resources for transmitting reference signals for CLI measurements and monitoring for reference signals for CLI measurements. The fixed resources may be suitable since the CLI between IAB nodes 810 may be more consistent or predictable. In some cases, however, one or more network entities 105 in a wireless communications system may be mobile, and the positions of these mobile network entities may change over time. As such, techniques for statically configuring resources for CLI measurements may be deficient. Further, mobile IAB or network entity 105 discovery and interference management may be underdeveloped. For instance, if a mobile network entity is configured to monitor fixed resources for reference signals from a static network entity and perform CLI measurements on the reference signals (e.g., or vice versa), the CLI measurements may not be useful if the mobile network entity moves far away from the static network entity.

The wireless communications system 100 and the network architecture 200 may support efficient techniques for configuring resources (e.g., dynamically) for CLI measurements at a network entity 105 (e.g., using inter-network entity backhaul signaling or inter-network entity over-the-air (OTA) signaling). The network entity 105 may be a mobile network entity 105 experiencing interference from a static network entity 105, a static network entity 105 experiencing interference from a mobile network entity 105, a mobile network entity 105 experiencing interference from another mobile network entity 105, or a static network entity 105 experiencing interference from another static network entity 105 (e.g., as described with reference to FIG. 8). A mobile network entity 105 may refer to a network entity 105 capable of moving or changing locations (e.g., a network entity whose geo-position varies), and a static network entity 105 may refer to a network entity 105 that is not mobile (e.g., a network entity whose geo-position is fixed).

Figure 9:
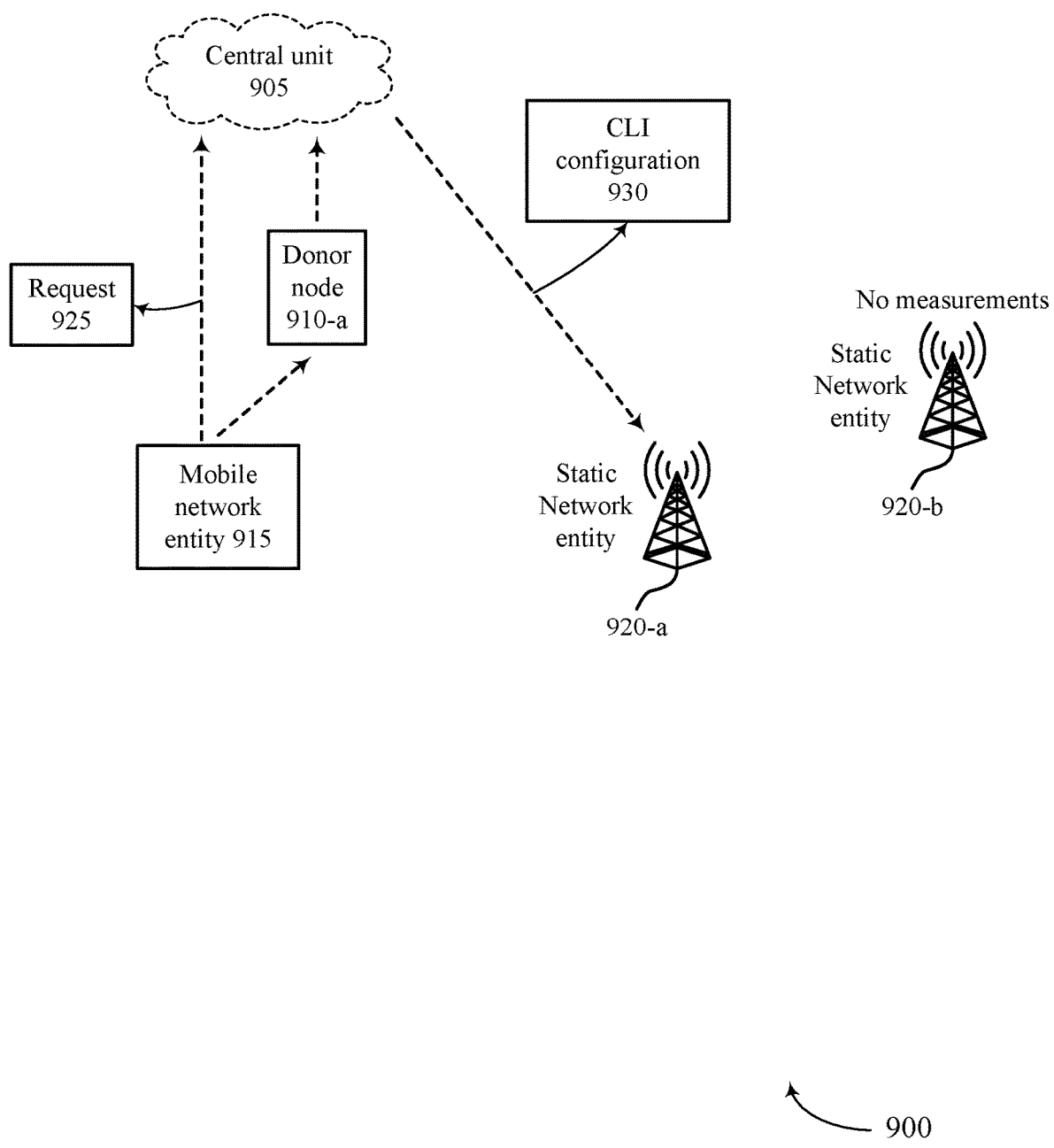
FIG. 9 illustrates an example of a wireless communications system that supports mobile network entity CLI measurement in accordance with one or more aspects of the present disclosure.

FIG. 9 illustrates an example of a wireless communications system 900 that supports mobile network entity CLI measurement in accordance with one or more aspects of the present disclosure. The wireless communications system 900 includes a CU 905, a donor node 910-*a*, a mobile network entity 915, a static network entity 920-*a*, and a static network entity 920-*b*, which may be examples of network entities 105 or corresponding devices described with reference to FIGS. 1-8. The wireless communications system 900 may implement aspects of the wireless communications system 100 or the network architecture 200. For instance, the wireless communications system 900 may support efficient techniques for configuring resources for CLI measurements at the mobile network entity 915 or the static network entity 920-*a*.

In one aspect, the CU 905 may configure aperiodic measurement resources (e.g., for SSBs) for CLI measurements at the mobile network entity 915 or the static network entity 920-*a*. The configuration from the CU 905 may include STC windows and SMTC windows for the mobile network entity 915, the static network entity 920-*a*, or both (e.g., for a static IAB or network entity or a mobile IAB or network entity). For instance, the mobile network entity 915 may receive an STC from the CU 905 for transmitting reference signals for CLI measurements at the static network entity 920-*a*, or the mobile network entity 915 may receive an SMTC from the CU 905 for monitoring for and receiving reference signals for CLI measurements at the mobile network entity 915. Similarly, the static network entity 920-*a* may receive an STC from the CU 905 for transmitting reference signals for CLI measurements at the mobile network entity 915, or the static network entity 920-*a* may receive an SMTC from the CU 905 for monitoring for and receiving reference signals for CLI measurements at the static network entity 920-*a*.

In another aspect, for finetuned inter-network entity interference measurements, request-based inter-network entity interference measurement may be appropriate. Further, the described techniques may allow for donor node indication and donor node switching.

In some examples, the CU 905 may preconfigure common windows or dedicated windows with a periodicity for the mobile network entity 915 to transmit reference signals for CLI measurements or receive reference signals for CLI measurements (e.g., for a mobile IAB or network entity to transmit and receive inter-network entity interference measurement reference signals). The CU 905 may also preconfigure common windows or dedicated windows with a periodicity for the static network entity 920-*a* to transmit reference signals for CLI measurements or receive reference signals for CLI measurements (e.g., the transmit and receive windows for a static IAB or network entity to transmit and receive inter-network entity interference measurement reference signals may be preconfigured by a central network entity).

The mobile network entity 915 may transmit a request 925 to the CU 905 or transmit a request to a neighbor DU (e.g., via a random access channel (RACH) procedure) for aperiodic, periodic, or semi-persistent measurement resources. In some examples, the mobile network entity 915 may request for an aperiodic transmission of reference signals for CLI measurements from neighbor network entities on different beams (e.g., downlink beams). In some examples, the mobile network entity 915 may request for an aperiodic reception of reference signals for CLI measurements from neighbor network entities on different beams (e.g., uplink beams), and the neighbor network entities may transmit an aperiodic transmission of reference signals for CLI measurements for the mobile network entity 915 to receive and measure. Beam information may be sent in the request 925 to measure a requested subset of beams (e.g., to save overhead). For instance, the request 925 may include an indication of beams for the static network entity 920-*a* to use to transmit reference signals for CLI measurements. In some examples, the static network entity 920-*a* (e.g., or a neighbor network entity) may be a network entity that creates strong CLI at the mobile network entity 915, where it may be appropriate to refine CLI measurements (e.g., based on coarse periodic measurements derived from CLI measurements on periodic resources).

Although the scenario described with reference to FIG. 9 includes a mobile network entity 915 requesting resources to monitor for reference signals from a static network entity 920-*a* for CLI measurements, the described techniques may also apply to other scenarios. For instance, the mobile network entity 915 may request resources to monitor for reference signals from another mobile network entity, or the static network entity 920-*a* may request resources to monitor for reference signals from the mobile network entity 915. For instance, if the static network entity 920-a measures strong inter-network entity interference (e.g., based on monitoring periodic common or dedicated windows), the static network entity 920-a may transmit a request to the CU 905 or transmit a request to a neighbor DU (e.g., via a RACH procedure) for aperiodic, periodic, or semi-persistent measurement resources. In some examples, the static network entity 920-a may request for an aperiodic transmission of reference signals for CLI measurements from the mobile network entity 915 on different beams (e.g., downlink beams). In some examples, the static network entity 920-a may request for an aperiodic reception of reference signals for CLI measurements from the mobile network entity 915 on different beams (e.g., uplink beams), and the mobile network entity 915 may transmit an aperiodic transmission of reference signals for CLI measurements for the static network entity 920-a to receive and measure. Beam information may be sent in the request from the static network entity 920-a to measure a requested subset of beams (e.g., to save overhead).

After receiving the request 925 from the mobile network entity 915 or a request from the static network entity 920-a, the CU 905 may transmit a CLI configuration to the mobile network entity 915 indicating a first set of resources for transmitting reference signals to the static network entity 920-a for CLI measurements or a second set of resources for receiving reference signals from the static network entity 920-a for CLI measurements. The CU 905 may also transmit a CLI configuration 930 to the static network entity 920-a indicating the first set of resources to monitor for reference signals from the mobile network entity 915 for CLI measurements or the second set of resources for transmitting reference signals to the mobile network entity 915 for CLI measurements. Thus, the measurement resources requested by the mobile network entity 915 or the static network entity 920-a (e.g., in the request 925 from the mobile network entity 915 or the request from the static network entity 920-a) may be for CLI transmission or reception, and the CLI configuration transmitted to the mobile network entity 915 or the CLI configuration 930 transmitted to the static network entity 920-a may be for CLI transmission or reception based on the request (e.g., request from the neighbor network entity).

The mobile network entity 915 may then transmit or receive reference signals (e.g., in accordance with a CLI configuration received from the CU 905), and the static network entity 920-a may transmit or receive reference signals for CLI measurements (e.g., in accordance with the CLI configuration 930 received from the CU 905). In one example, the mobile network entity 915 may transmit reference signals on the first set of resources, and the static network entity 920-a may receive the reference signals on the first set of resources and perform CLI measurements on the reference signals. The static network entity 920-a may then report the CLI measurements, and the CLI measurements may be used to schedule communications at the static network entity 920-a, the mobile network entity 915, or both. In another example, the static network entity 920-a may transmit reference signals on the second set of resources, and the mobile network entity 915 may receive the reference signals on the second set of resources and perform CLI measurements on the reference signals. The mobile network entity 915 may then report the CLI measurements, and the CLI measurements may be used to schedule communications at the mobile network entity 915, the static network entity 920-a, or both.

In some aspects, a donor node connected to a first mobile network entity may signal to nearby static network entities or mobile network entities directly or via a CU about whether the first mobile network entity has moved closer to or farther from the nearby static network entities or mobile network entities (e.g., in or out of a threshold distance of the nearby static network entities or mobile network entities). Thus, the nearby static network entities or mobile network entities may be able to detect the first mobile network entity and start or stop monitoring or listening during configured windows for reference signals from the first mobile network entity (e.g., to measure the inter-network entity interference reference signals transmitted by the first mobile network entity).

In an example, the donor node 910-a may signal to the static network entity 920-a that the static network entity 920-a is within a threshold distance of the mobile network entity 915 or vice versa. As such, the mobile network entity 915 may request resources to transmit reference signals to or receive reference signals from the static network entity 920-a, or the static network entity 920-a may request resources to transmit reference signals to or receive reference signals from the mobile network entity 915. In another example, the donor node 910-a may signal to the static network entity 920-b that the static network entity 920-b is outside a threshold distance of the mobile network entity 915 or vice versa. As such, the mobile network entity 915 may avoid requesting resources for transmitting reference signals to or receiving reference signals from the static network entity 920-b, or the static network entity 920-b may avoid requesting resources for transmitting reference signals to or receiving reference signals from the mobile network entity 915.

Figure 10:
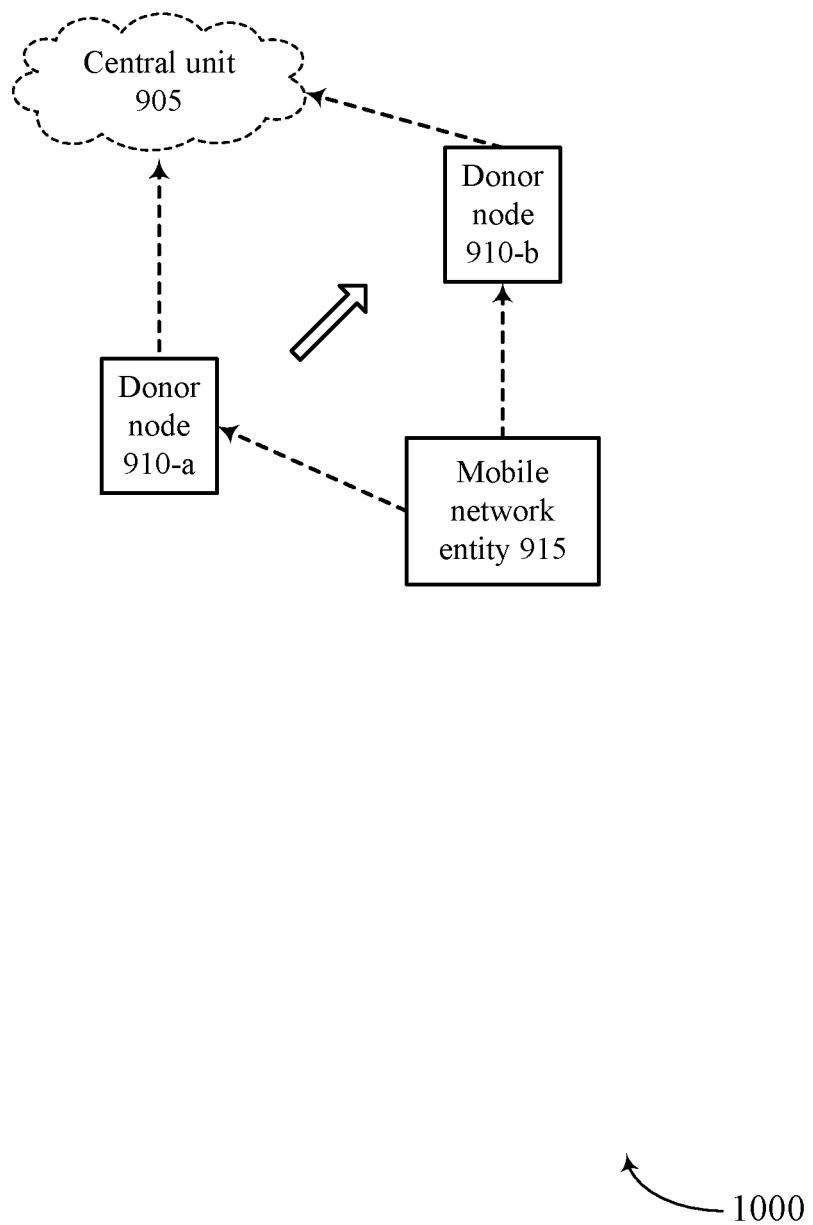
FIG. 10 illustrates an example of donor node switching in accordance with one or more aspects of the present disclosure.

FIG. 10 illustrates an example of donor node switching 1000 in accordance with one or more aspects of the present disclosure. In some aspects, the CU 905 may determine whether the mobile network entity 915 is to switch to a new or different donor node. For instance, due to mobility, the donor node 910-a (e.g., a former donor node) may be farther away from the mobile network entity 915, and the CU 905 may signal for the mobile network entity 915 to switch to connecting to the donor node 910-b (e.g., a new or different donor node). The CU 905 may determine the donor node 910-b to which the mobile network entity 915 may connect based on a measurement report from the mobile network entity 915 or another network entity. The measurement report may include measurements for neighbor network entities and IDs of neighbor network entities with an interference level above or below a threshold. An interference metric associated with each transmit and receive beam pair may also be included in the measurement report.

In an example, the CU 905 may determine, based on the measurement report, a donor node with which the mobile network entity 915 may connect. The CU 905 may determine that the mobile network entity 915 is to connect to the donor node 910-b based at least in part on measurements in the measurement report for the donor node 910-b satisfying a threshold. Further, the CU 905 may determine that the mobile network entity 915 is to disconnect from the donor node 910-a based at least in part on measurements in the measurement report for the donor node 910-a failing to satisfy a threshold.

Satisfying a threshold or failing to satisfy a threshold may, depending on the context, refer to a value being greater than the threshold, greater than or equal to the threshold, less than the threshold, less than or equal to the threshold, equal to the threshold, not equal to the threshold, or the like.

Figure 11:
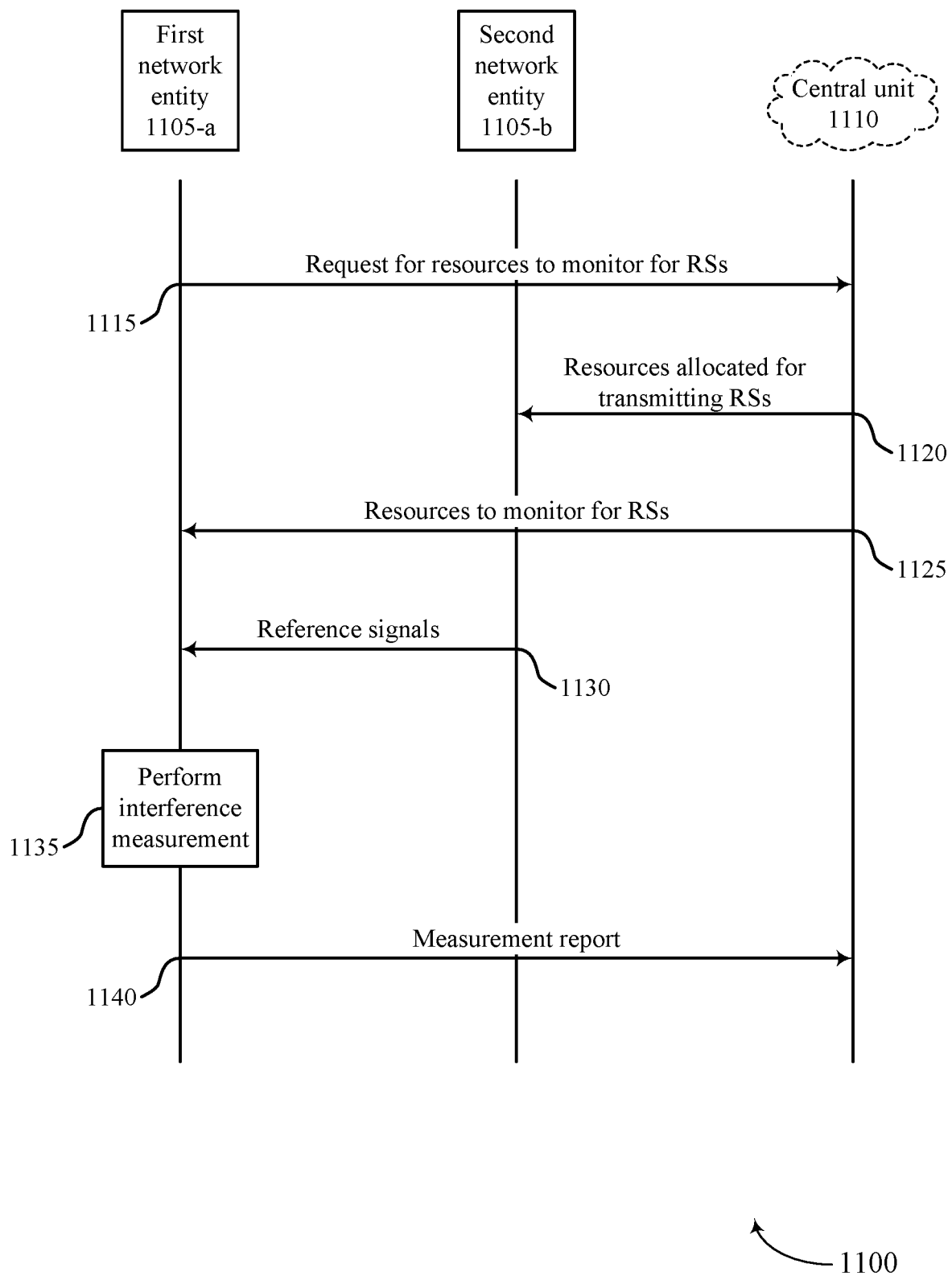
FIG. 11 illustrates an example of a process flow that supports mobile network entity CLI measurement in accordance with one or more aspects of the present disclosure.

FIG. 11 illustrates an example of a process flow 1100 that supports mobile network entity CLI measurement in accordance with one or more aspects of the present disclosure. The process flow 1100 includes a first network entity 1105-a, a second network entity 1105-b, and a CU 1110, which may be examples of network entities 105 or corresponding devices described with reference to FIGS. 1-10. The first network entity 1105-a may be a static network entity and the second network entity 1105-b may be a mobile network entity, the first network entity 1105-a may be a mobile network entity and the second network entity 1105-b may be a static network entity, or the first network entity 1105-a and the second network entity 1105-b may be mobile network entities. The process flow 1100 may implement aspects of the wireless communications system 100, the network architecture 200, or the wireless communications system 900. For instance, the process flow 1100 may support efficient techniques for configuring resources for CLI measurements at the first network entity 1105-a or the static network entity 1105-b.

At 1115, the first network entity 1105-a may transmit a request for resources for the first network entity 1105-a to monitor for one or more first reference signals from the second network entity 1105-b. The resources requested by the first network entity 1105-a may include periodic resources, aperiodic resources, or semi-persistent resources. Periodic resources may correspond to resources allocated indefinitely at regular intervals (e.g., with an undefined quantity of repetitions), aperiodic resources may correspond to a single (e.g., irregular) allocation of resources, and semi-persistent resources may correspond to resources allocated at regular intervals with a defined quantity of repetitions.

The first network entity 1105-a and the second network entity 1105-b may each be configured to provide communications for one or more UEs 115. In some examples, the request may be for the second network entity 1105-b to transmit the one or more first reference signals on the resources using a set of beams. In some examples, the request may be for the second network entity 1105-b to transmit the one or more first reference signals on the resources for reception at the first network entity 1105-a using a set of beams. In some examples, the first network entity 1105-a may transmit the request based at least in part on detecting interference (e.g., from the second network entity 1105-b), changing locations, a trigger from a parent node (e.g., a donor node), etc.

The CU 1110 may receive the request from the first network entity 1105-a, and, at 1120, the CU 1110 may transmit (e.g., in an STC) an indication of the resources on which the second network entity 1105-b may transmit the one or more first reference signals. At 1125, the CU 1110 may also transmit (e.g., in an SMTC) an indication of the resources for the first network entity 1105-a to monitor for the one or more first reference signals from the second network entity 1105-b. At 1130, the first network entity 1105-a may receive the one or more first reference signals on the resources from the second network entity 1105-b. The first network entity 1105-a may monitor for the one or more first reference signals on the resources in response to transmitting the request.

At 1135, the first network entity 1105-a may perform interference measurement of the resources based on the monitoring (e.g., CLI measurements on the one or more first reference signals received on the resources), and, at 1140, the first network entity 1105-a may transmit a report of the interference measurement (e.g., to the CU 1110). In some examples, the CU 1110 may transmit, and the first network entity 1105-a or the second network entity 1105-b may receive, a control message scheduling communication at the first network entity 1105-a or the second network entity 1105-b based on the report of the interference measurement. In some examples, the CU 1110 may schedule communications at another network entity based on the interference measurement. In some examples, the first network entity 1105-a may schedule communications at the first network entity 1105-a based on the interference measurement.

In some examples, the first network entity 1105-a may receive an indication of periodic resources to monitor for one or more second reference signals from the second network entity 1105-b, and the first network entity 1105-a may receive the one or more second reference signals on the periodic resources and perform interference measurement on the one or more second reference signals. In some examples, the first network entity 1105-a may transmit, in the request for resources and based on the interference measurement performed on the one or more second reference signals, an indication of one or more beams for the second network entity 1105-b to use to transmit the one or more first reference signals. In some examples, the first network entity 1105-a may identify the one or more beams based on the interference measurement performed on the one or more second reference signals satisfying a threshold (e.g., a reference signal received power (RSRP) threshold).

In some examples, the first network entity 1105-a may receive an indication from a donor node or the CU 1110 to perform the interference measurement on the one or more second reference signals or avoid performing the interference measurement on the one or more second reference signals. The donor node or the CU 1110 may determine whether the second network entity 1105-b is within a threshold distance of the first network entity 1105-a and may configure the first network entity 1105-b accordingly. For instance, the donor node or the CU 1110 may transmit, and the first network entity 1105-a may receive, an indication to perform the interference measurement on the one or more second reference signals received on the periodic resources if the second network entity 1105-b is within a threshold distance of the first network entity 1105-a. In some examples, the donor node or the CU 1110 may transmit, and the first network entity 1105-a may receive, an indication to avoid performing subsequent interference measurement on the one or more second reference signals received on the periodic resources if the second network entity 1105-b is outside a threshold distance of the first network entity 1105-a.

In some examples, the first network entity 1105-a may receive (e.g., from the CU 1110) an indication for the first network entity 1105-a to switch from connecting to a first donor node to connecting to a second donor node based on the report of the interference measurement.

In some examples, the CU 1110 may transmit (e.g., without a request from the first network entity 1105-a) an indication of aperiodic resources for the first network entity 1105-a to monitor for one or more reference signals from the second network entity 1105-b. The first network entity 1105-a may receive the indication of the aperiodic resources and may monitor for the one or more reference signals on the aperiodic resources. The first network entity 1105-a may also perform interference measurement of the aperiodic resources based on the monitoring, and the first network entity 1105-a may transmit a report of the interference measurement. In some examples, the first network entity 1105-a may receive (e.g., from the CU 1110) a control message scheduling communication at the first network entity 1105-*a* based on the report of the interference measurement. The first network entity 1105-*a* may also schedule communication at the first network entity 1105-*a* based on the interference measurement.

In the description of the process flow 1100, the signaling exchanged between the first network entity 1105-*a*, the second network entity 1105-*b*, and the CU 1110 may be exchanged in a different order than the example order shown, or the operations performed by the first network entity 1105-*a*, the second network entity 1105-*b*, and the CU 1110 may be performed in different orders or at different times. Some operations may also be omitted from the process flow 1100, and other operations may be added to the process flow 1100. For instance, instead of transmitting a request for resources to the CU 1110, the first network entity 1105-*a* may transmit the request to the second network entity 1105-*b* or another network entity. The first network entity 1105-*a* may then receive an indication of resources to monitor for the reference signals (e.g., from the second network entity 1105-*b* or another network entity), and the first network entity 1105-*a* monitor the resources for the reference signals from the second network entity 1105-*b*.

Figure 12:
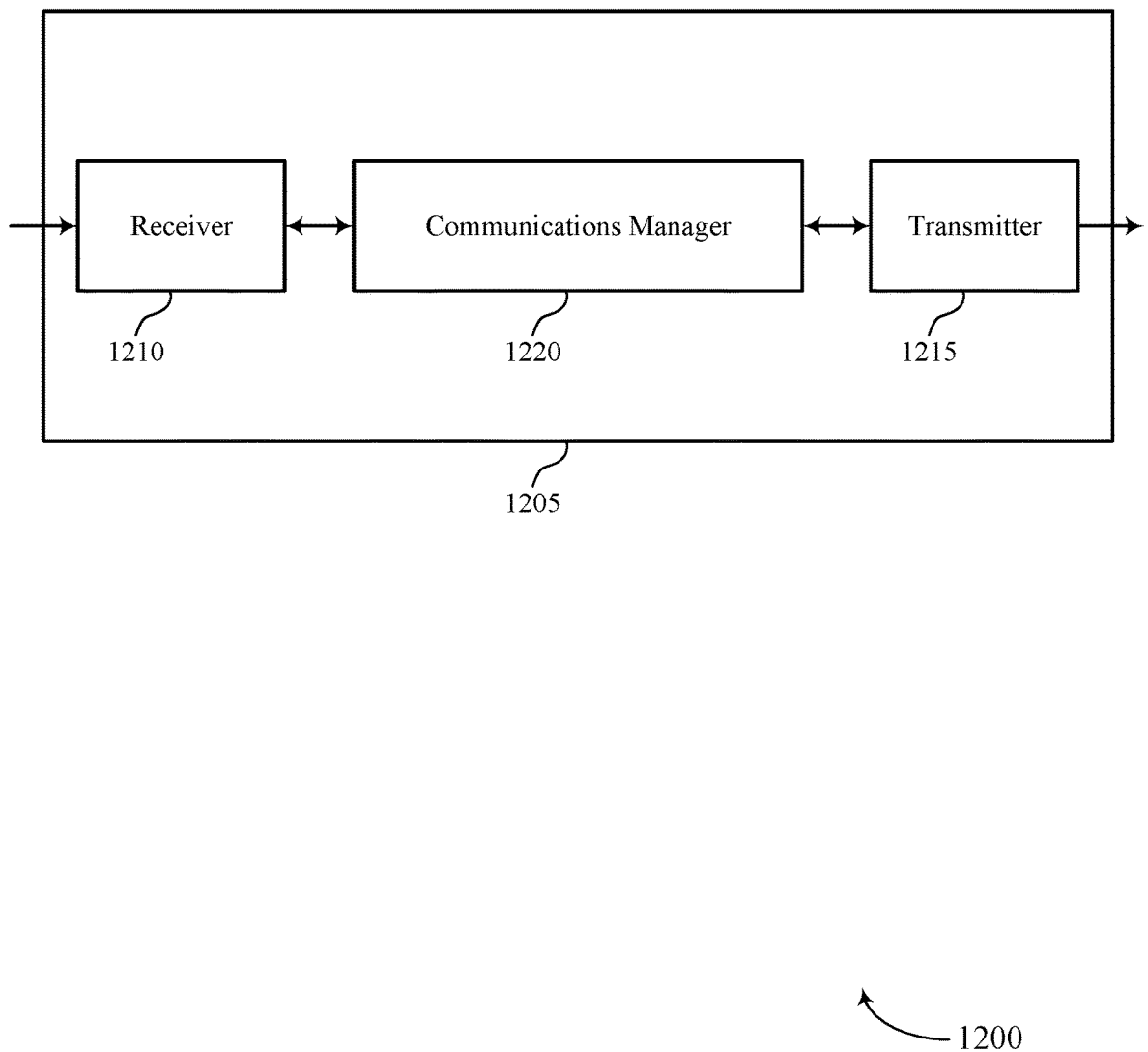
FIGS. 12 and 13 show block diagrams of devices that support mobile network entity CLI measurement in accordance with one or more aspects of the present disclosure.

FIG. 12 shows a block diagram 1200 of a device 1205 that supports mobile network entity CLI measurement in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of mobile network entity CLI measurement as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a first network entity in accordance with examples as disclosed herein. For example, the communications manager 1220 may be configured as or otherwise support a means for transmitting a request for resources for the first network entity to monitor for one or more first reference signals from a second network entity, the first network entity and the second network entity each configured to provide communications for one or more user equipment (UEs). The communications manager 1220 may be configured as or otherwise support a means for monitoring for the one or more first reference signals on the resources in response to transmitting the request. The communications manager 1220 may be configured as or otherwise support a means for performing interference measurement of the resources based on the monitoring. The communications manager 1220 may be configured as or otherwise support a means for transmitting a report of the interference measurement.

Additionally, or alternatively, the communications manager 1220 may support wireless communication in accordance with examples as disclosed herein. For example, the communications manager 1220 may be configured as or otherwise support a means for receiving a request for resources for a first network entity to monitor for one or more first reference signals from a second network entity, the first network entity and the second network entity each configured to provide communications for one or more user equipment (UEs). The communications manager 1220 may be configured as or otherwise support a means for transmitting an indication of the resources for the first network entity to monitor for the one or more first reference signals from the second network entity. The communications manager 1220 may be configured as or otherwise support a means for receiving, based on transmitting the indication of the resources, a report of interference measurement performed by the first network entity on the one or more first reference signals.

Additionally, or alternatively, the communications manager 1220 may support wireless communication at a first network entity in accordance with examples as disclosed herein. For example, the communications manager 1220 may be configured as or otherwise support a means for receiving an indication of aperiodic resources for the first network entity to monitor for one or more reference signals from a second network entity, the first network entity and the second network entity each configured to provide communications for one or more user equipment (UEs). The communications manager 1220 may be configured as or otherwise support a means for monitoring for the one or more reference signals on the aperiodic resources. The communications manager 1220 may be configured as or otherwise support a means for performing interference measurement of the aperiodic resources based on the monitoring. The communications manager 1220 may be configured as or otherwise support a means for transmitting a report of the interference measurement.

Additionally, or alternatively, the communications manager 1220 may support wireless communication in accordance with examples as disclosed herein. For example, the communications manager 1220 may be configured as or otherwise support a means for transmitting an indication of aperiodic resources for a first network entity to monitor for one or more reference signals from a second network entity, the first network entity and the second network entity each configured to provide communications for one or more user equipment (UEs). The communications manager 1220 may be configured as or otherwise support a means for receiving a report of interference measurement performed by the first network entity on the one or more reference signals received from the second network entity. The communications manager 1220 may be configured as or otherwise support a means for scheduling communication at the first network entity or another network entity based on the report of the interference measurement.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for reduced processing, reduced power consumption, and more efficient utilization of communication resources. In particular, the device 1205 may support techniques for using configuration signaling to facilitate CLI measurements and scheduling based on the CLI measurements (e.g., in a system supporting mobile network entities). As such, communications at the device 1205 or other devices may be scheduled based on the CLI measurements to prevent or mitigate CLI, resulting in the reduced processing, reduced power consumption, and the more efficient utilization of communication resources due to the reduced CLI.

Figure 13:
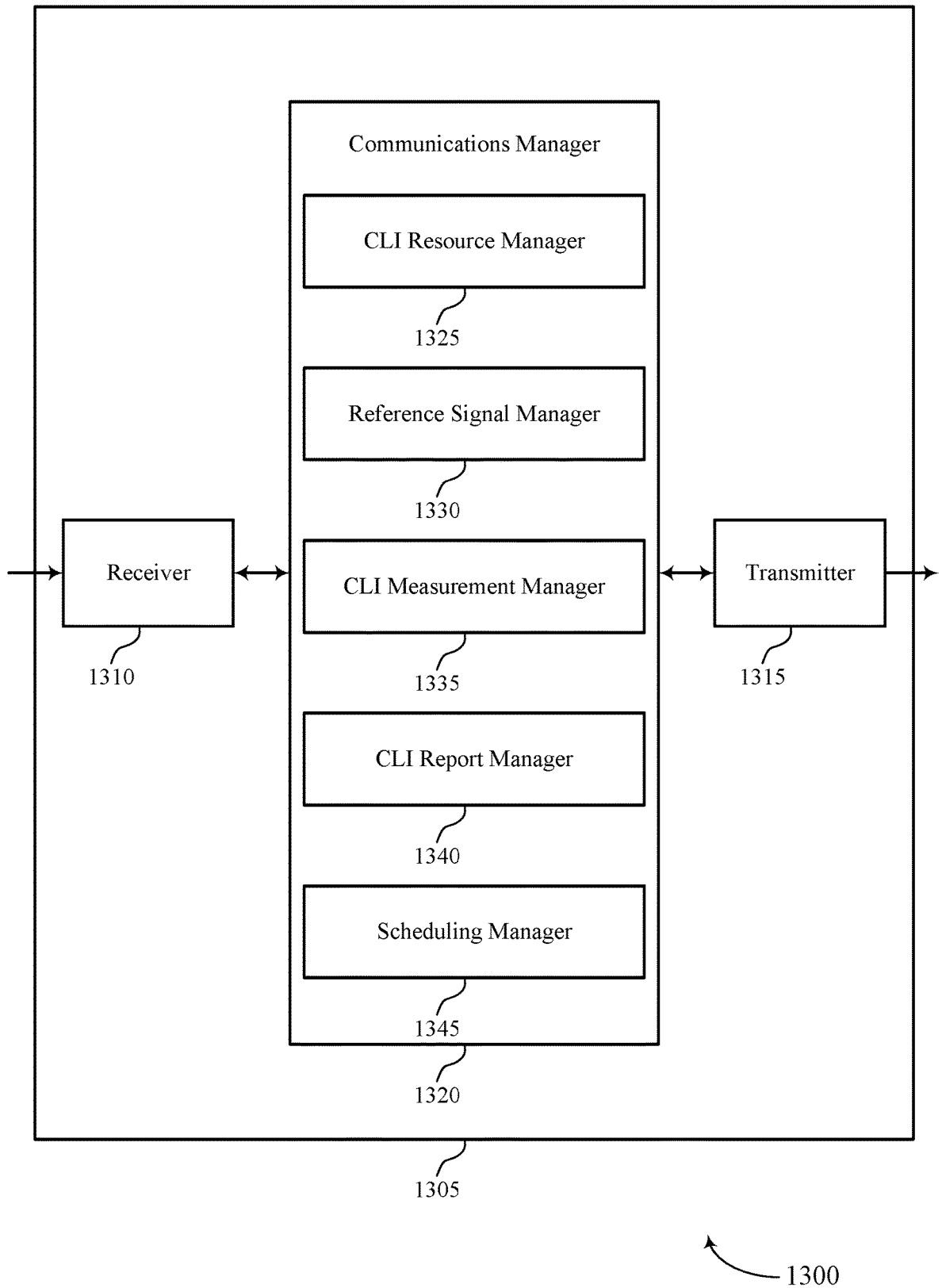

FIG. 13 shows a block diagram 1300 of a device 1305 that supports mobile network entity CLI measurement in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of mobile network entity CLI measurement as described herein. For example, the communications manager 1320 may include a CLI resource manager 1325, a reference signal manager 1330, a CLI measurement manager 1335, a CLI report manager 1340, a scheduling manager 1345, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a first network entity in accordance with examples as disclosed herein. The CLI resource manager 1325 may be configured as or otherwise support a means for transmitting a request for resources for the first network entity to monitor for one or more first reference signals from a second network entity, the first network entity and the second network entity each configured to provide communications for one or more user equipment (UEs). The reference signal manager 1330 may be configured as or otherwise support a means for monitoring for the one or more first reference signals on the resources in response to transmitting the request. The CLI measurement manager 1335 may be configured as or otherwise support a means for performing interference measurement of the resources based on the monitoring. The CLI report manager 1340 may be configured as or otherwise support a means for transmitting a report of the interference measurement.

Additionally, or alternatively, the communications manager 1320 may support wireless communication in accordance with examples as disclosed herein. The CLI resource manager 1325 may be configured as or otherwise support a means for receiving a request for resources for a first network entity to monitor for one or more first reference signals from a second network entity, the first network entity and the second network entity each configured to provide communications for one or more user equipment (UEs). The CLI resource manager 1325 may be configured as or otherwise support a means for transmitting an indication of the resources for the first network entity to monitor for the one or more first reference signals from the second network entity. The CLI report manager 1340 may be configured as or otherwise support a means for receiving, based on transmitting the indication of the resources, a report of interference measurement performed by the first network entity on the one or more first reference signals.

Additionally, or alternatively, the communications manager 1320 may support wireless communication at a first network entity in accordance with examples as disclosed herein. The CLI resource manager 1325 may be configured as or otherwise support a means for receiving an indication of aperiodic resources for the first network entity to monitor for one or more reference signals from a second network entity, the first network entity and the second network entity each configured to provide communications for one or more user equipment (UEs). The reference signal manager 1330 may be configured as or otherwise support a means for monitoring for the one or more reference signals on the aperiodic resources. The CLI measurement manager 1335 may be configured as or otherwise support a means for performing interference measurement of the aperiodic resources based on the monitoring. The CLI report manager 1340 may be configured as or otherwise support a means for transmitting a report of the interference measurement.

Additionally, or alternatively, the communications manager 1320 may support wireless communication in accordance with examples as disclosed herein. The CLI resource manager 1325 may be configured as or otherwise support a means for transmitting an indication of aperiodic resources for a first network entity to monitor for one or more reference signals from a second network entity, the first network entity and the second network entity each configured to provide communications for one or more user equipment (UEs). The CLI report manager 1340 may be configured as or otherwise support a means for receiving a report of interference measurement performed by the first network entity on the one or more reference signals received from the second network entity. The scheduling manager 1345 may be configured as or otherwise support a means for scheduling communication at the first network entity or another network entity based on the report of the interference measurement.

Figure 14:
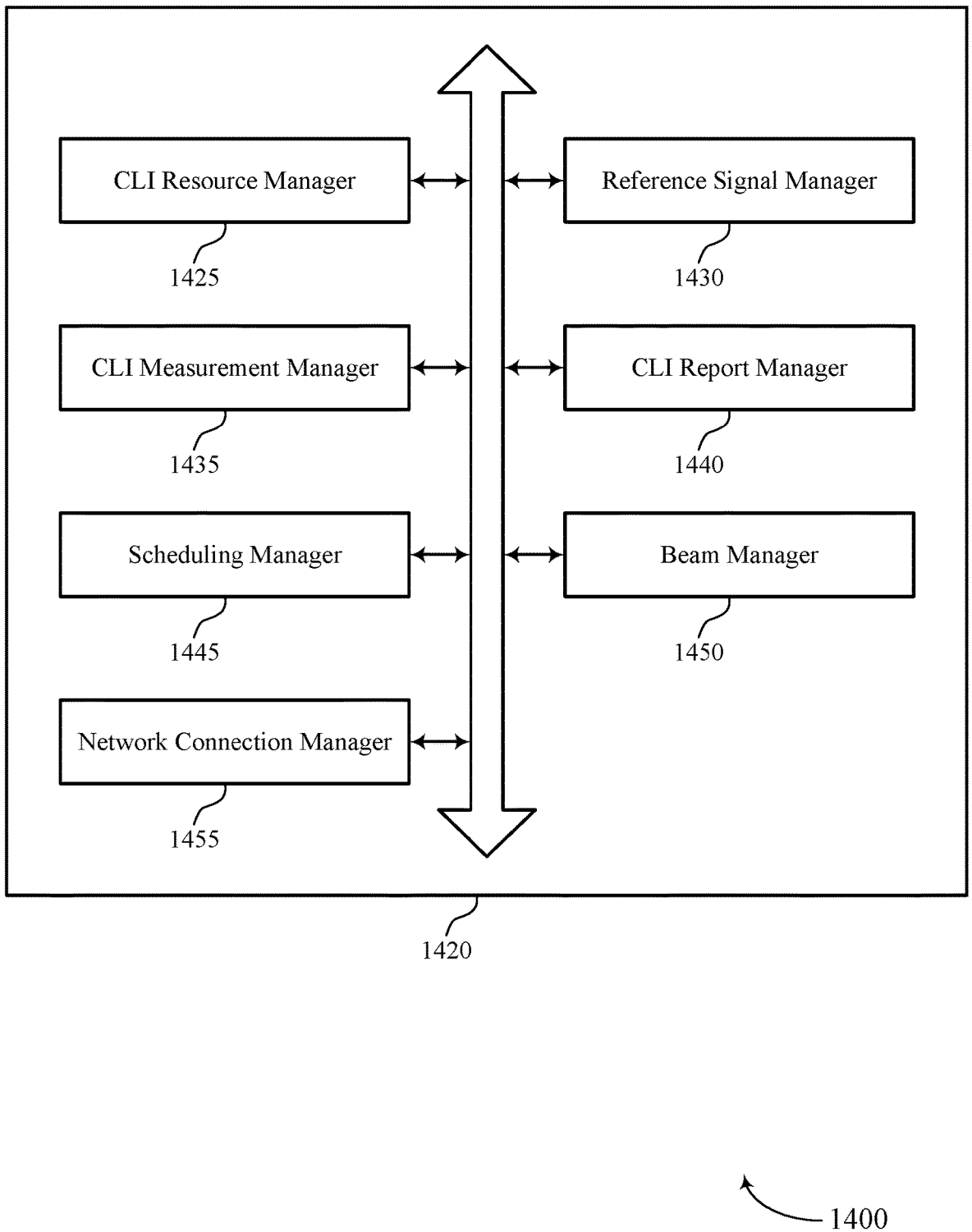
FIG. 14 shows a block diagram of a communications manager that supports mobile network entity CLI measurement in accordance with one or more aspects of the present disclosure.

FIG. 14 shows a block diagram 1400 of a communications manager 1420 that supports mobile network entity CLI measurement in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of mobile network entity CLI measurement as described herein. For example, the communications manager 1420 may include a CLI resource manager 1425, a reference signal manager 1430, a CLI measurement manager 1435, a CLI report manager 1440, a scheduling manager 1445, a beam manager 1450, a network connection manager 1455, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communication at a first network entity in accordance with examples as disclosed herein. The CLI resource manager 1425 may be configured as or otherwise support a means for transmitting a request for resources for the first network entity to monitor for one or more first reference signals from a second network entity, the first network entity and the second network entity each configured to provide communications for one or more user equipment (UEs). The reference signal manager 1430 may be configured as or otherwise support a means for monitoring for the one or more first reference signals on the resources in response to transmitting the request. The CLI measurement manager 1435 may be configured as or otherwise support a means for performing interference measurement of the resources based on the monitoring. The CLI report manager 1440 may be configured as or otherwise support a means for transmitting a report of the interference measurement.

In some examples, to support transmitting the request for resources, the beam manager 1450 may be configured as or otherwise support a means for transmitting a request for the second network entity to transmit the one or more first reference signals on the resources using a set of multiple beams.

In some examples, to support transmitting the request for resources, the beam manager 1450 may be configured as or otherwise support a means for transmitting a request for the second network entity to transmit the one or more first reference signals on the resources for reception at the first network entity using a set of multiple beams.

In some examples, the CLI resource manager 1425 may be configured as or otherwise support a means for receiving an indication of periodic resources to monitor for one or more second reference signals from the second network entity. In some examples, the reference signal manager 1430 may be configured as or otherwise support a means for receiving the one or more second reference signals on the periodic resources. In some examples, the CLI measurement manager 1435 may be configured as or otherwise support a means for performing interference measurement on the one or more second reference signals.

In some examples, the beam manager 1450 may be configured as or otherwise support a means for transmitting, in the request for resources and based on the interference measurement performed on the one or more second reference signals, an indication of one or more beams for the second network entity to use to transmit the one or more first reference signals.

In some examples, the beam manager 1450 may be configured as or otherwise support a means for identifying the one or more beams based on the interference measurement performed on the one or more second reference signals transmitted on the one or more beams satisfying a threshold.

In some examples, the CLI measurement manager 1435 may be configured as or otherwise support a means for receiving an indication to perform the interference measurement on the one or more second reference signals received on the periodic resources based on the second network entity being within a threshold distance of the first network entity, where performing the interference measurement is based on receiving the indication.

In some examples, the CLI measurement manager 1435 may be configured as or otherwise support a means for receiving an indication to avoid performing subsequent interference measurement on the one or more second reference signals received on the periodic resources based on the second network entity being outside a threshold distance of the first network entity.

In some examples, the network connection manager 1455 may be configured as or otherwise support a means for receiving an indication for the first network entity to switch from connecting to a first donor node to connecting to a second donor node based on the report of the interference measurement.

In some examples, the scheduling manager 1445 may be configured as or otherwise support a means for receiving, from a third network entity, a control message scheduling communication at the first network entity based on the report of the interference measurement.

In some examples, the scheduling manager 1445 may be configured as or otherwise support a means for scheduling communication at the first network entity based on the interference measurement.

In some examples, the first network entity includes a static network entity and the second network entity includes a mobile network entity, the first network entity includes a mobile network entity and the second network entity includes a static network entity, or the first network entity and the second network entity include mobile network entities.

In some examples, the resources requested by the first network entity includes periodic resources, aperiodic resources, or semi-persistent resources.

Additionally, or alternatively, the communications manager 1420 may support wireless communication in accordance with examples as disclosed herein. In some examples, the CLI resource manager 1425 may be configured as or otherwise support a means for receiving a request for resources for a first network entity to monitor for one or more first reference signals from a second network entity, the first network entity and the second network entity each configured to provide communications for one or more user equipment (UEs). In some examples, the CLI resource manager 1425 may be configured as or otherwise support a means for transmitting an indication of the resources for the first network entity to monitor for the one or more first reference signals from the second network entity. In some examples, the CLI report manager 1440 may be configured as or otherwise support a means for receiving, based on transmitting the indication of the resources, a report of interference measurement performed by the first network entity on the one or more first reference signals.

In some examples, to support receiving the request for resources, the beam manager 1450 may be configured as or otherwise support a means for receiving a request for the second network entity to transmit the one or more first reference signals on the resources using a set of multiple beams.

In some examples, to support receiving the request for resources, the beam manager 1450 may be configured as or otherwise support a means for receiving a request for the second network entity to transmit the one or more first reference signals on the resources for reception at the first network entity using a set of multiple beams.

In some examples, the CLI resource manager 1425 may be configured as or otherwise support a means for transmitting an indication of periodic resources for the first network entity to monitor for one or more second reference signals from the second network entity. In some examples, the CLI report manager 1440 may be configured as or otherwise support a means for receiving, based on transmitting the indication of periodic resources, a second report of interference measurement performed by the first network entity on the one or more second reference signals.

In some examples, the beam manager 1450 may be configured as or otherwise support a means for receiving, in the request for resources and based on the interference measurement performed on the one or more second reference signals, an indication of one or more beams for the second network entity to use to transmit the one or more first reference signals.

In some examples, the network connection manager 1455 may be configured as or otherwise support a means for transmitting an indication for the first network entity to switch from connecting to a first donor node to connecting to a second donor node based on the report of the interference measurement.

In some examples, the scheduling manager 1445 may be configured as or otherwise support a means for transmitting a control message scheduling communication at the first network entity based on the report of the interference measurement.

In some examples, the scheduling manager 1445 may be configured as or otherwise support a means for scheduling communication at another network entity based on the interference measurement.

In some examples, the first network entity includes a static network entity and the second network entity includes a mobile network entity, the first network entity includes a mobile network entity and the second network entity includes a static network entity, or the first network entity and the second network entity include mobile network entities.

In some examples, the resources requested by the first network entity includes periodic resources, aperiodic resources, or semi-persistent resources.

Additionally, or alternatively, the communications manager 1420 may support wireless communication at a first network entity in accordance with examples as disclosed herein. In some examples, the CLI resource manager 1425 may be configured as or otherwise support a means for receiving an indication of aperiodic resources for the first network entity to monitor for one or more reference signals from a second network entity, the first network entity and the second network entity each configured to provide communications for one or more user equipment (UEs). In some examples, the reference signal manager 1430 may be configured as or otherwise support a means for monitoring for the one or more reference signals on the aperiodic resources. In some examples, the CLI measurement manager 1435 may be configured as or otherwise support a means for performing interference measurement of the aperiodic resources based on the monitoring. In some examples, the CLI report manager 1440 may be configured as or otherwise support a means for transmitting a report of the interference measurement.

In some examples, the scheduling manager 1445 may be configured as or otherwise support a means for receiving, from a third network entity, a control message scheduling communication at the first network entity based on the report of the interference measurement.

In some examples, the scheduling manager 1445 may be configured as or otherwise support a means for scheduling communication at the first network entity based on the interference measurement.

Additionally, or alternatively, the communications manager 1420 may support wireless communication in accordance with examples as disclosed herein. In some examples, the CLI resource manager 1425 may be configured as or otherwise support a means for transmitting an indication of aperiodic resources for a first network entity to monitor for one or more reference signals from a second network entity, the first network entity and the second network entity each configured to provide communications for one or more user equipment (UEs). In some examples, the CLI report manager 1440 may be configured as or otherwise support a means for receiving a report of interference measurement performed by the first network entity on the one or more reference signals received from the second network entity. The scheduling manager 1445 may be configured as or otherwise support a means for scheduling communication at the first network entity or another network entity based on the report of the interference measurement.

Figure 15:
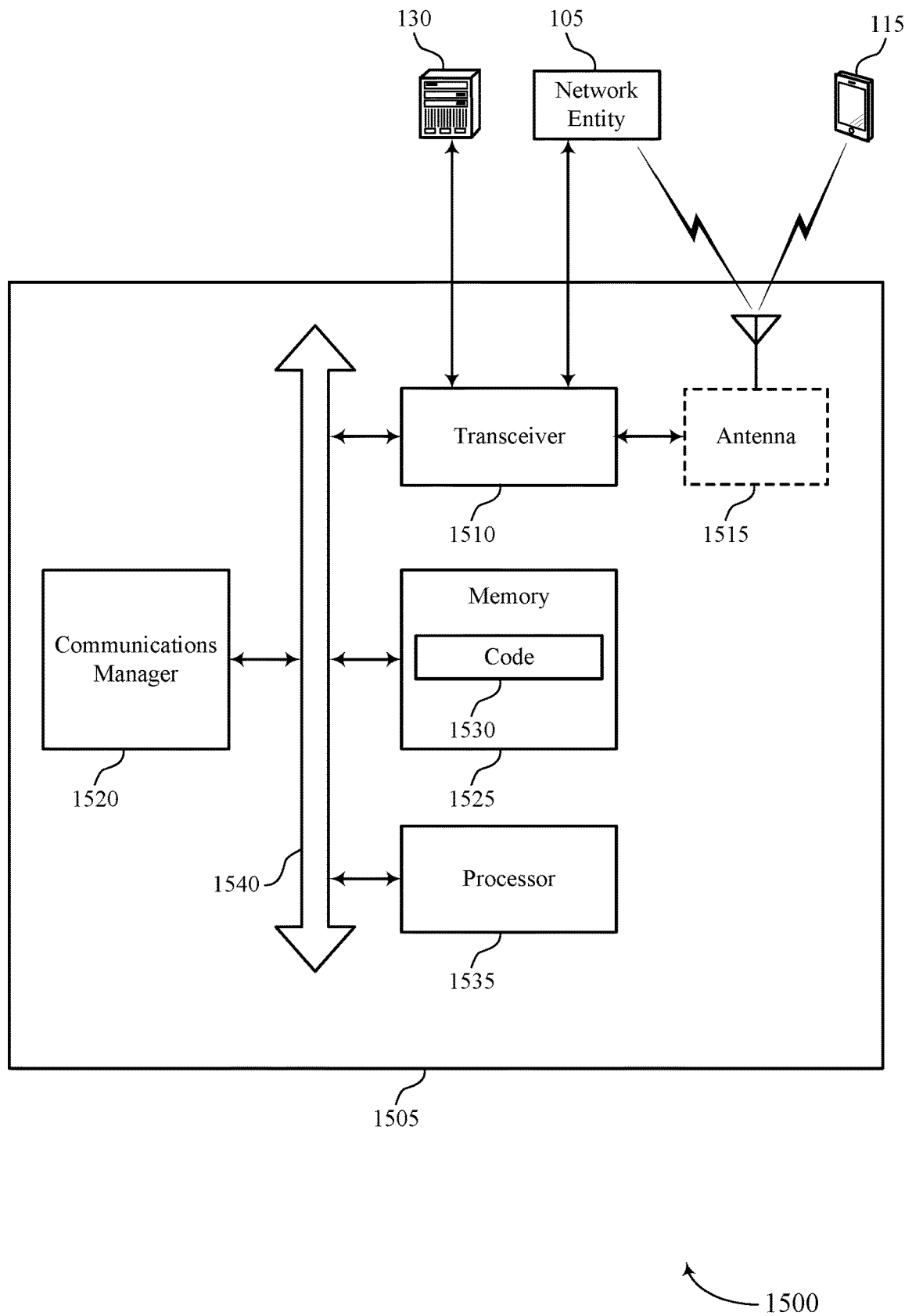
FIG. 15 shows a diagram of a system including a device that supports mobile network entity CLI measurement in accordance with one or more aspects of the present disclosure.

FIG. 15 shows a diagram of a system 1500 including a device 1505 that supports mobile network entity CLI measurement in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or memory components (for example, the processor 1535, or the memory 1525, or both), may be included in a chip or chip assembly that is installed in the device 1505. The transceiver 1510, or the transceiver 1510 and one or more antennas 1515 or wired interfaces, where applicable, may be an example of a transmitter 1215, a transmitter 1315, a receiver 1210, a receiver 1310, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting mobile network entity CLI measurement). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505. The processor 1535 may be any one or more suitable processors capable of executing scripts or instructions of one or more software programs stored in the device 1505 (such as within the memory 1525). In some implementations, the processor 1535 may be a component of a processing system. A processing system may generally refer to a system or series of machines or components that receives inputs and processes the inputs to produce a set of outputs (which may be passed to other systems or components of, for example, the device 1505). For example, a processing system of the device 1505 may refer to a system including the various other components or subcomponents of the device 1505, such as the processor 1535, or the transceiver 1510, or the communications manager 1520, or other components or combinations of components of the device 1505. The processing system of the device 1505 may interface with other components of the device 1505, and may process information received from other components (such as inputs or signals) or output information to other components. For example, a chip or modem of the device 1505 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1505 may transmit information output from the chip or modem. In some implementations, the second interface may refer to an interface between the processing system of the chip or modem and a receiver, such that the device 1505 may obtain information or signal inputs, and the information may be passed to the processing system. A person having ordinary skill in the art will readily recognize that the first interface also may obtain information or signal inputs, and the second interface also may output information or signal outputs.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communication at a first network entity in accordance with examples as disclosed herein. For example, the communications manager 1520 may be configured as or otherwise support a means for transmitting a request for resources for the first network entity to monitor for one or more first reference signals from a second network entity, the first network entity and the second network entity each configured to provide communications for one or more user equipment (UEs). The communications manager 1520 may be configured as or otherwise support a means for monitoring for the one or more first reference signals on the resources in response to transmitting the request. The communications manager 1520 may be configured as or otherwise support a means for performing interference measurement of the resources based on the monitoring. The communications manager 1520 may be configured as or otherwise support a means for transmitting a report of the interference measurement.

Additionally, or alternatively, the communications manager 1520 may support wireless communication in accordance with examples as disclosed herein. For example, the communications manager 1520 may be configured as or otherwise support a means for receiving a request for resources for a first network entity to monitor for one or more first reference signals from a second network entity, the first network entity and the second network entity each configured to provide communications for one or more user equipment (UEs). The communications manager 1520 may be configured as or otherwise support a means for transmitting an indication of the resources for the first network entity to monitor for the one or more first reference signals from the second network entity. The communications manager 1520 may be configured as or otherwise support a means for receiving, based on transmitting the indication of the resources, a report of interference measurement performed by the first network entity on the one or more first reference signals.

Additionally, or alternatively, the communications manager 1520 may support wireless communication at a first network entity in accordance with examples as disclosed herein. For example, the communications manager 1520 may be configured as or otherwise support a means for receiving an indication of aperiodic resources for the first network entity to monitor for one or more reference signals from a second network entity, the first network entity and the second network entity each configured to provide communications for one or more user equipment (UEs). The communications manager 1520 may be configured as or otherwise support a means for monitoring for the one or more reference signals on the aperiodic resources. The communications manager 1520 may be configured as or otherwise support a means for performing interference measurement of the aperiodic resources based on the monitoring. The communications manager 1520 may be configured as or otherwise support a means for transmitting a report of the interference measurement.

Additionally, or alternatively, the communications manager 1520 may support wireless communication in accordance with examples as disclosed herein. For example, the communications manager 1520 may be configured as or otherwise support a means for transmitting an indication of aperiodic resources for a first network entity to monitor for one or more reference signals from a second network entity, the first network entity and the second network entity each configured to provide communications for one or more user equipment (UEs). The communications manager 1520 may be configured as or otherwise support a means for receiving a report of interference measurement performed by the first network entity on the one or more reference signals received from the second network entity. The communications manager 1520 may be configured as or otherwise support a means for scheduling communication at the first network entity or another network entity based on the report of the interference measurement.

By including or configuring the communications manager 1520 in accordance with examples as described herein, the device 1505 may support techniques for reduced processing, reduced power consumption, and more efficient utilization of communication resources. In particular, the device 1505 may support techniques for using configuration signaling to facilitate CLI measurements and scheduling based on the CLI measurements (e.g., in a system supporting mobile network entities). As such, communications at the device 1505 or other devices may be scheduled based on the CLI measurements to prevent or mitigate CLI, resulting in the reduced processing, reduced power consumption, and the more efficient utilization of communication resources due to the reduced CLI.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the processor 1535, the memory 1525, the code 1530, the transceiver 1510, or any combination thereof. For example, the code 1530 may include instructions executable by the processor 1535 to cause the device 1505 to perform various aspects of mobile network entity CLI measurement as described herein, or the processor 1535 and the memory 1525 may be otherwise configured to perform or support such operations.

Figure 16:
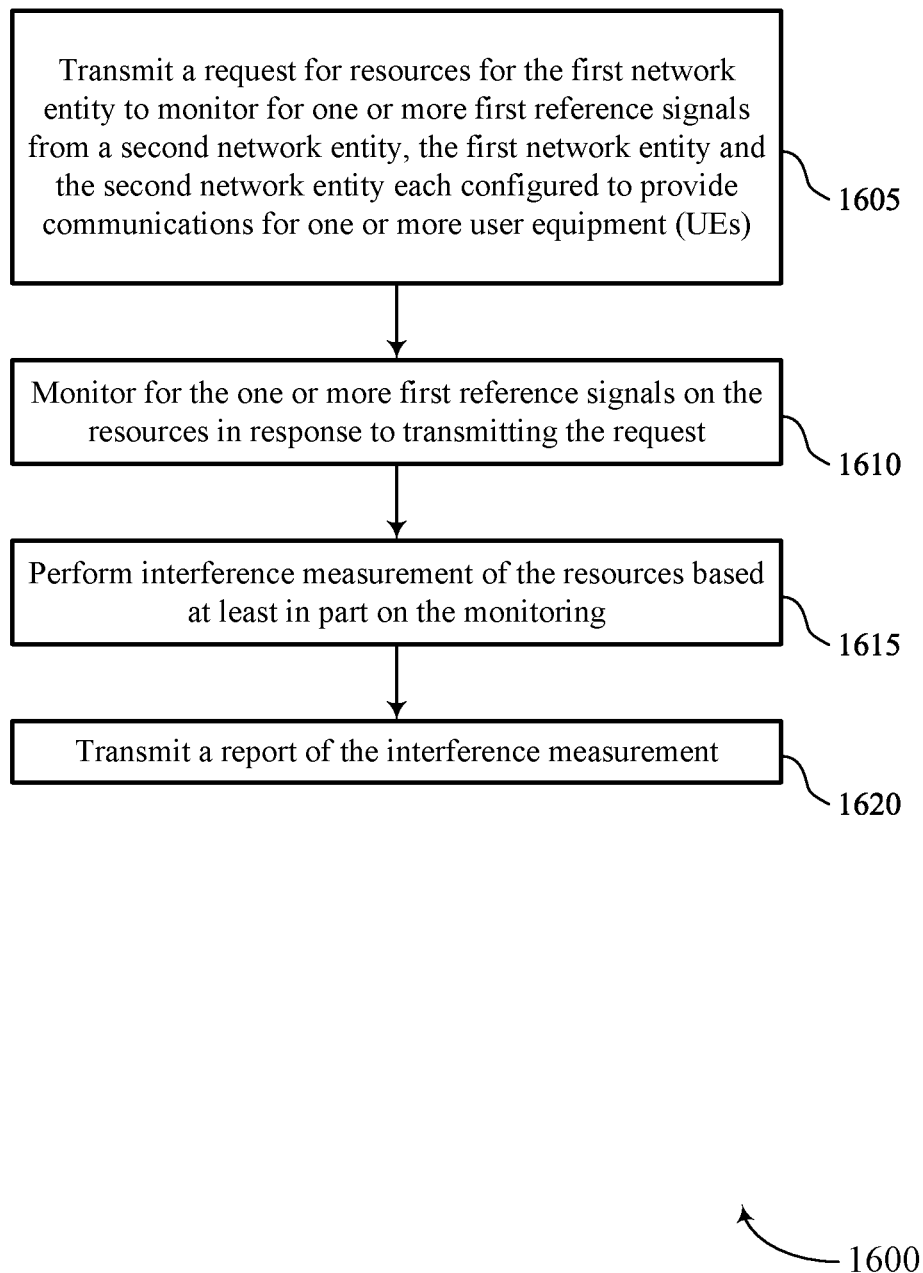
FIGS. 16 through 19 show flowcharts illustrating methods that support mobile network entity CLI measurement in accordance with one or more aspects of the present disclosure.

FIG. 16 shows a flowchart illustrating a method 1600 that supports mobile network entity CLI measurement in accordance with one or more aspects of the present disclosure. The operations of the method 1600 may be implemented by a network entity or its components as described herein. For example, the operations of the method 1600 may be performed by a network entity as described with reference to FIGS. 1 through 15. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a request for resources for the first network entity to monitor for one or more first reference signals from a second network entity, the first network entity and the second network entity each configured to provide communications for one or more user equipment (UEs). The operations of 1605 may be performed in accordance with examples as disclosed herein. In some examples, aspects of the operations of 1605 may be performed by a CLI resource manager 1425 as described with reference to FIG. 14.

At 1610, the method may include monitoring for the one or more first reference signals on the resources in response to transmitting the request. The operations of 1610 may be performed in accordance with examples as disclosed herein. In some examples, aspects of the operations of 1610 may be performed by a reference signal manager 1430 as described with reference to FIG. 14.

At 1615, the method may include performing interference measurement of the resources based on the monitoring. The operations of 1615 may be performed in accordance with examples as disclosed herein. In some examples, aspects of the operations of 1615 may be performed by a CLI measurement manager 1435 as described with reference to FIG. 14.

At 1620, the method may include transmitting a report of the interference measurement. The operations of 1620 may be performed in accordance with examples as disclosed herein. In some examples, aspects of the operations of 1620 may be performed by a CLI report manager 1440 as described with reference to FIG. 14.

Figure 17:
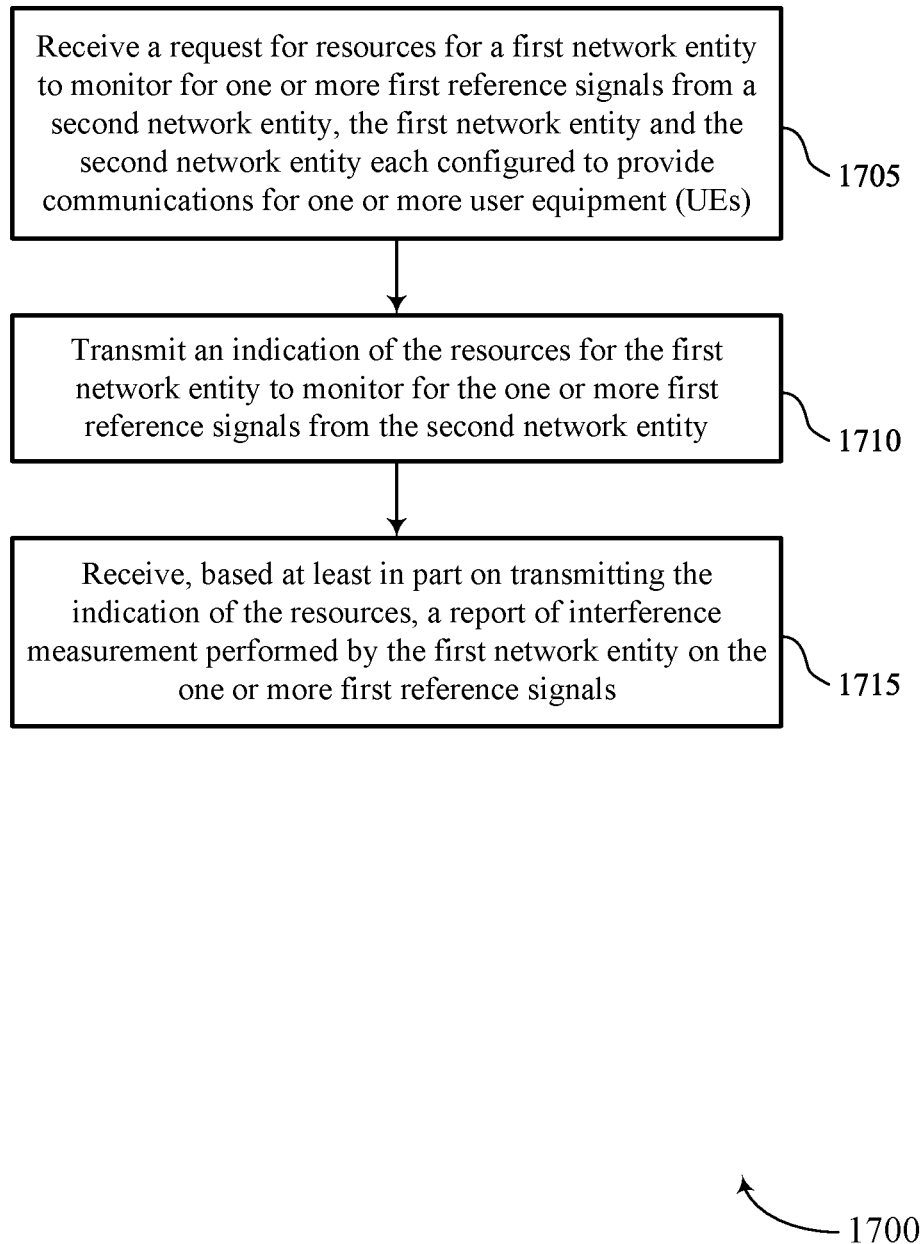

FIG. 17 shows a flowchart illustrating a method 1700 that supports mobile network entity CLI measurement in accordance with one or more aspects of the present disclosure. The operations of the method 1700 may be implemented by a network entity or its components as described herein. For example, the operations of the method 1700 may be performed by a network entity as described with reference to FIGS. 1 through 15. In some examples, a network entity may execute a set of instructions to control the functional elements of the network entity to perform the described functions. Additionally, or alternatively, the network entity may perform aspects of the described functions using special-purpose hardware.

At 1705, the method may include receiving a request for resources for a first network entity to monitor for one or more first reference signals from a second network entity, the first network entity and the second network entity each configured to provide communications for one or more user equipment (UEs). The operations of 1705 may be performed in accordance with examples as disclosed herein. In some examples, aspects of the operations of 1705 may be performed by a CLI resource manager 1425 as described with reference to FIG. 14.

At 1710, the method may include transmitting an indication of the resources for the first network entity to monitor for the one or more first reference signals from the second network entity. The operations of 1710 may be performed in accordance with examples as disclosed herein. In some examples, aspects of the operations of 1710 may be performed by a CLI resource manager 1425 as described with reference to FIG. 14.

At 1715, the method may include receiving, based on transmitting the indication of the resources, a report of interference measurement performed by the first network entity on the one or more first reference signals. The operations of 1715 may be performed in accordance with examples as disclosed herein. In some examples, aspects of the operations of 1715 may be performed by a CLI report manager 1440 as described with reference to FIG. 14.

Figure 18:
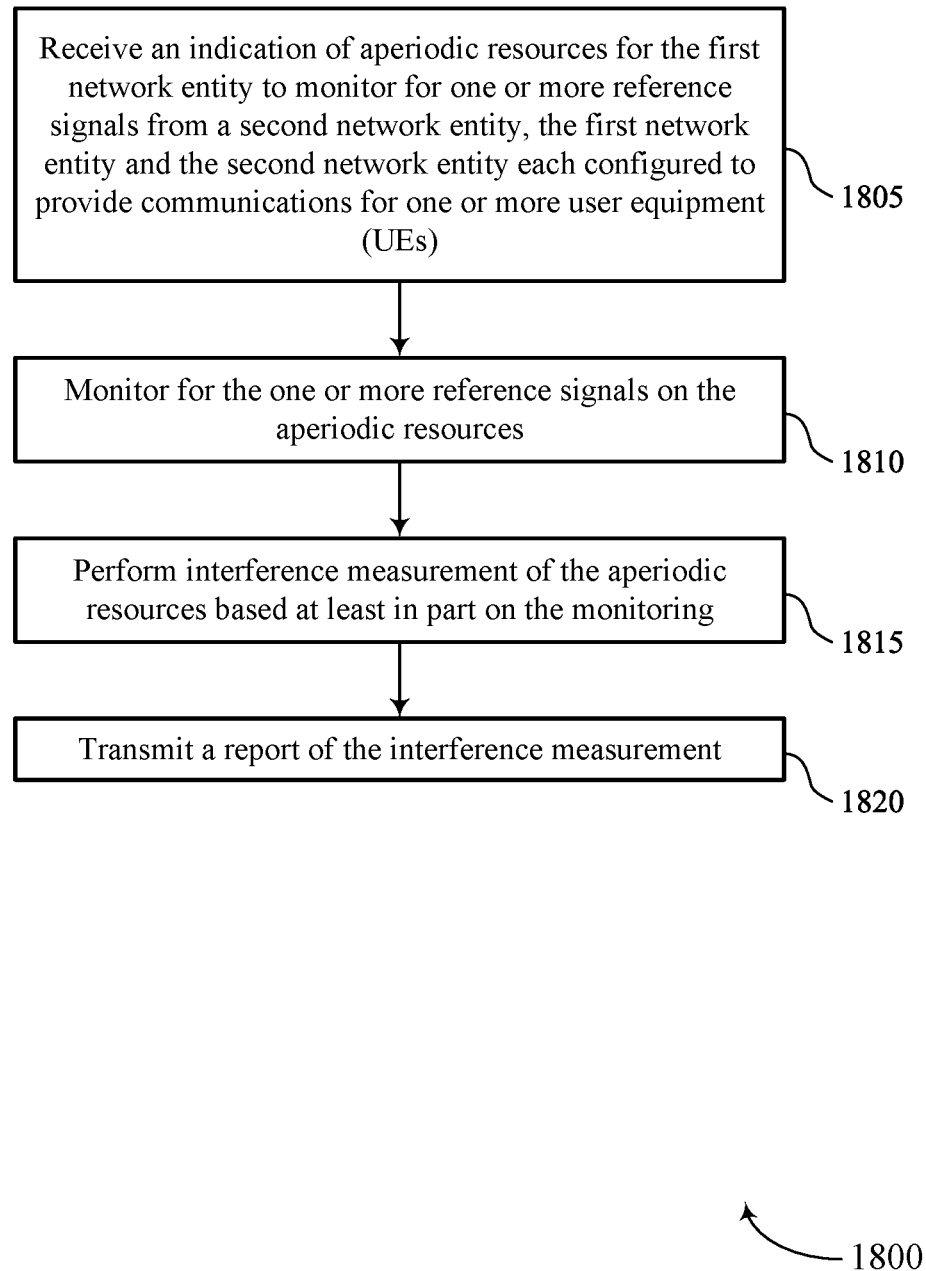

FIG. 18 shows a flowchart illustrating a method 1800 that supports mobile network entity CLI measurement in accordance with one or more aspects of the present disclosure. The operations of the method 1800 may be implemented by a network entity or its components as described herein. For example, the operations of the method 1800 may be performed by a network entity as described with reference to FIGS. 1 through 15. In some examples, a network entity may execute a set of instructions to control the functional elements of the network entity to perform the described functions. Additionally, or alternatively, the network entity may perform aspects of the described functions using special-purpose hardware.

At 1805, the method may include receiving an indication of aperiodic resources for the first network entity to monitor for one or more reference signals from a second network entity, the first network entity and the second network entity each configured to provide communications for one or more user equipment (UEs). The operations of 1805 may be performed in accordance with examples as disclosed herein. In some examples, aspects of the operations of 1805 may be performed by a CLI resource manager 1425 as described with reference to FIG. 14.

At 1810, the method may include monitoring for the one or more reference signals on the aperiodic resources. The operations of 1810 may be performed in accordance with examples as disclosed herein. In some examples, aspects of the operations of 1810 may be performed by a reference signal manager 1430 as described with reference to FIG. 14.

At 1815, the method may include performing interference measurement of the aperiodic resources based on the monitoring. The operations of 1815 may be performed in accordance with examples as disclosed herein. In some examples, aspects of the operations of 1815 may be performed by a CLI measurement manager 1435 as described with reference to FIG. 14.

At 1820, the method may include transmitting a report of the interference measurement. The operations of 1820 may be performed in accordance with examples as disclosed herein. In some examples, aspects of the operations of 1820 may be performed by a CLI report manager 1440 as described with reference to FIG. 14.

Figure 19:
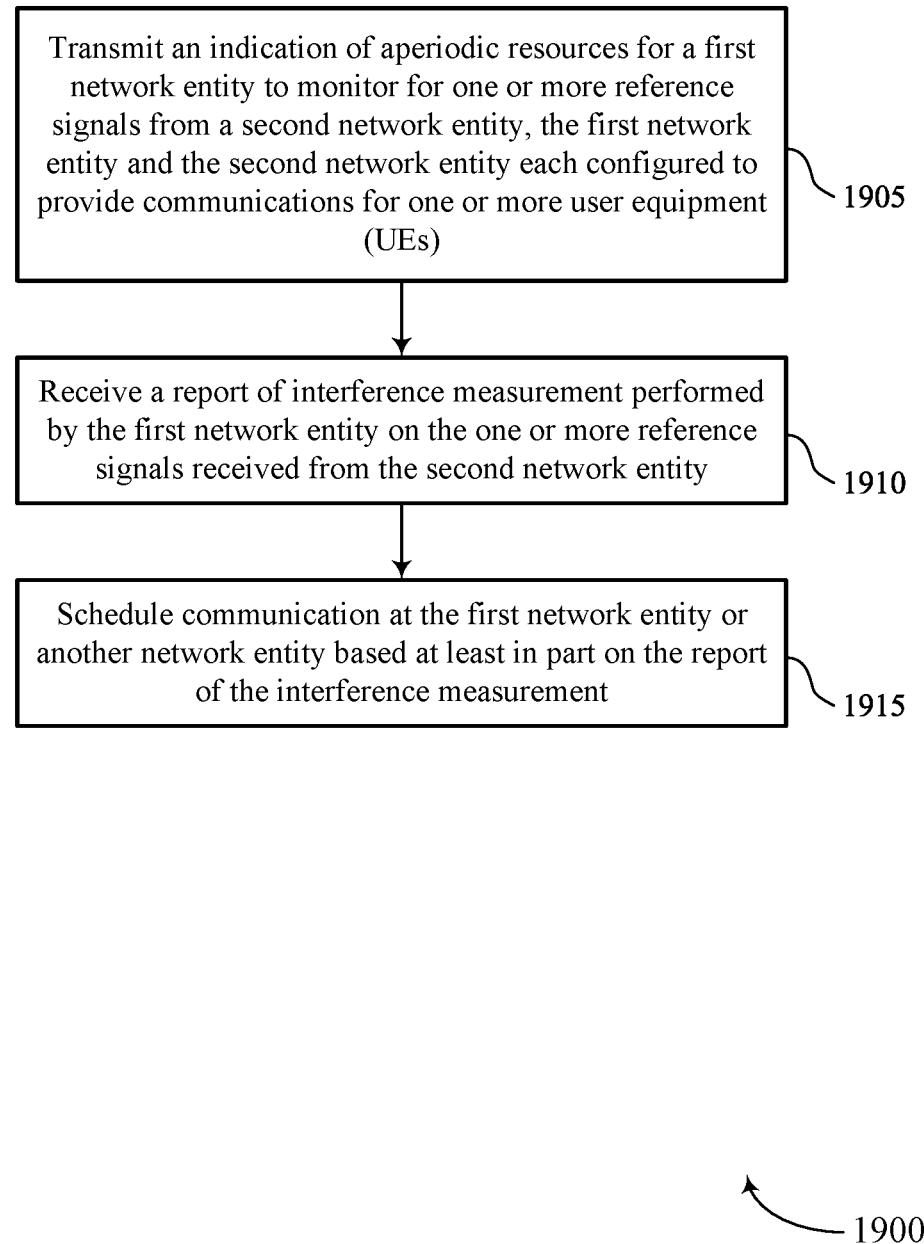

FIG. 19 shows a flowchart illustrating a method 1900 that supports mobile network entity CLI measurement in accordance with one or more aspects of the present disclosure. The operations of the method 1900 may be implemented by a network entity or its components as described herein. For example, the operations of the method 1900 may be performed by a network entity as described with reference to FIGS. 1 through 15. In some examples, a network entity may execute a set of instructions to control the functional elements of the network entity to perform the described functions. Additionally, or alternatively, the network entity may perform aspects of the described functions using special-purpose hardware.

At 1905, the method may include transmitting an indication of aperiodic resources for a first network entity to monitor for one or more reference signals from a second network entity, the first network entity and the second network entity each configured to provide communications for one or more user equipment (UEs). The operations of 1905 may be performed in accordance with examples as disclosed herein. In some examples, aspects of the operations of 1905 may be performed by a CLI resource manager 1425 as described with reference to FIG. 14.

At 1910, the method may include receiving a report of interference measurement performed by the first network entity on the one or more reference signals received from the second network entity. The operations of 1910 may be performed in accordance with examples as disclosed herein. In some examples, aspects of the operations of 1910 may be performed by a CLI report manager 1440 as described with reference to FIG. 14.

At 1915, the method may include scheduling communication at the first network entity or another network entity based on the report of the interference measurement. The operations of 1915 may be performed in accordance with examples as disclosed herein. In some examples, aspects of the operations of 1915 may be performed by a scheduling manager 1445 as described with reference to FIG. 14.

The following provides an overview of aspects of the present disclosure:

Aspect 1: A method for wireless communication at a first network entity, comprising: transmitting a request for resources for the first network entity to monitor for one or more first reference signals from a second network entity, the first network entity and the second network entity each configured to provide communications for one or more user equipment (UEs); monitoring for the one or more first reference signals on the resources in response to transmitting the request; performing interference measurement of the resources based at least in part on the monitoring; and transmitting a report of the interference measurement.

Aspect 2: The method of aspect 1, wherein transmitting the request for resources comprises: transmitting a request for the second network entity to transmit the one or more first reference signals on the resources using a plurality of beams.

Aspect 3: The method of any of aspects 1 through 2, wherein transmitting the request for resources comprises: transmitting a request for the second network entity to transmit the one or more first reference signals on the resources for reception at the first network entity using a plurality of beams.

Aspect 4: The method of any of aspects 1 through 3, further comprising: receiving an indication of periodic resources to monitor for one or more second reference signals from the second network entity; receiving the one or more second reference signals on the periodic resources; and performing interference measurement on the one or more second reference signals.

Aspect 5: The method of aspect 4, further comprising: transmitting, in the request for resources and based at least in part on the interference measurement performed on the one or more second reference signals, an indication of one or more beams for the second network entity to use to transmit the one or more first reference signals.

Aspect 6: The method of aspect 5, further comprising: identifying the one or more beams based at least in part on the interference measurement performed on the one or more second reference signals transmitted on the one or more beams satisfying a threshold.

Aspect 7: The method of any of aspects 4 through 6, further comprising: receiving an indication to perform the interference measurement on the one or more second reference signals received on the periodic resources based at least in part on the second network entity being within a threshold distance of the first network entity, wherein performing the interference measurement is based at least in part on receiving the indication.

Aspect 8: The method of any of aspects 4 through 7, further comprising: receiving an indication to avoid performing subsequent interference measurement on the one or more second reference signals received on the periodic resources based at least in part on the second network entity being outside a threshold distance of the first network entity.

Aspect 9: The method of any of aspects 1 through 8, further comprising: receiving an indication for the first network entity to switch from connecting to a first donor node to connecting to a second donor node based at least in part on the report of the interference measurement.

Aspect 10: The method of any of aspects 1 through 9, further comprising: receiving, from a third network entity, a control message scheduling communication at the first network entity based at least in part on the report of the interference measurement.

Aspect 11: The method of any of aspects 1 through 10, further comprising: scheduling communication at the first network entity based at least in part on the interference measurement.

Aspect 12: The method of any of aspects 1 through 11, wherein the first network entity comprises a static network entity and the second network entity comprises a mobile network entity, the first network entity comprises a mobile network entity and the second network entity comprises a static network entity, or the first network entity and the second network entity comprise mobile network entities.

Aspect 13: The method of any of aspects 1 through 12, wherein the resources requested by the first network entity comprises periodic resources, aperiodic resources, or semi-persistent resources.

Aspect 14: A method for wireless communication, comprising: receiving a request for resources for a first network entity to monitor for one or more first reference signals from a second network entity, the first network entity and the second network entity each configured to provide communications for one or more user equipment (UEs); transmitting an indication of the resources for the first network entity to monitor for the one or more first reference signals from the second network entity; and receiving, based at least in part on transmitting the indication of the resources, a report of interference measurement performed by the first network entity on the one or more first reference signals.

Aspect 15: The method of aspect 14, wherein receiving the request for resources comprises: receiving a request for the second network entity to transmit the one or more first reference signals on the resources using a plurality of beams.

Aspect 16: The method of any of aspects 14 through 15, wherein receiving the request for resources comprises: receiving a request for the second network entity to transmit the one or more first reference signals on the resources for reception at the first network entity using a plurality of beams.

Aspect 17: The method of any of aspects 14 through 16, further comprising: transmitting an indication of periodic resources for the first network entity to monitor for one or more second reference signals from the second network entity; and receiving, based at least in part on transmitting the indication of periodic resources, a second report of interference measurement performed by the first network entity on the one or more second reference signals.

Aspect 18: The method of aspect 17, further comprising: receiving, in the request for resources and based at least in part on the interference measurement performed on the one or more second reference signals, an indication of one or more beams for the second network entity to use to transmit the one or more first reference signals.

Aspect 19: The method of any of aspects 14 through 18, further comprising: transmitting an indication for the first network entity to switch from connecting to a first donor node to connecting to a second donor node based at least in part on the report of the interference measurement.

Aspect 20: The method of any of aspects 14 through 19, further comprising: transmitting a control message scheduling communication at the first network entity based at least in part on the report of the interference measurement.

Aspect 21: The method of any of aspects 14 through 20, further comprising: scheduling communication at another network entity based at least in part on the interference measurement.

Aspect 22: The method of any of aspects 14 through 21, wherein the first network entity comprises a static network entity and the second network entity comprises a mobile network entity, the first network entity comprises a mobile network entity and the second network entity comprises a static network entity, or the first network entity and the second network entity comprise mobile network entities.

Aspect 23: The method of any of aspects 14 through 22, wherein the resources requested by the first network entity comprises periodic resources, aperiodic resources, or semi-persistent resources.

Aspect 24: A method for wireless communication at a first network entity, comprising: receiving an indication of aperiodic resources for the first network entity to monitor for one or more reference signals from a second network entity, the first network entity and the second network entity each configured to provide communications for one or more user equipment (UEs); monitoring for the one or more reference signals on the aperiodic resources; performing interference measurement of the aperiodic resources based at least in part on the monitoring; and transmitting a report of the interference measurement.

Aspect 25: The method of aspect 24, further comprising: receiving, from a third network entity, a control message scheduling communication at the first network entity based at least in part on the report of the interference measurement.

Aspect 26: The method of any of aspects 24 through 25, further comprising: scheduling communication at the first network entity based at least in part on the interference measurement.

Aspect 27: A method for wireless communication, comprising: transmitting an indication of aperiodic resources for a first network entity to monitor for one or more reference signals from a second network entity, the first network entity and the second network entity each configured to provide communications for one or more user equipment (UEs); receiving a report of interference measurement performed by the first network entity on the one or more reference signals received from the second network entity; and scheduling communication at the first network entity or another network entity based at least in part on the report of the interference measurement.

Aspect 28: An apparatus for wireless communication at a first network entity, comprising a processor; memory coupled with the processor; and instructions stored in the memory and executable by the processor to cause the apparatus to perform a method of any of aspects 1 through 13.

Aspect 29: An apparatus for wireless communication at a first network entity, comprising at least one means for performing a method of any of aspects 1 through 13.

Aspect 30: A non-transitory computer-readable medium storing code for wireless communication at a first network entity, the code comprising instructions executable by a processor to perform a method of any of aspects 1 through 13.

Aspect 31: An apparatus for wireless communication, comprising a processor; memory coupled with the processor; and instructions stored in the memory and executable by the processor to cause the apparatus to perform a method of any of aspects 14 through 23.

Aspect 32: An apparatus for wireless communication, comprising at least one means for performing a method of any of aspects 14 through 23.

Aspect 33: A non-transitory computer-readable medium storing code for wireless communication, the code comprising instructions executable by a processor to perform a method of any of aspects 14 through 23.

Aspect 34: An apparatus for wireless communication at a first network entity, comprising a processor; memory coupled with the processor; and instructions stored in the memory and executable by the processor to cause the apparatus to perform a method of any of aspects 24 through 26.

Aspect 35: An apparatus for wireless communication at a first network entity, comprising at least one means for performing a method of any of aspects 24 through 26.

Aspect 36: A non-transitory computer-readable medium storing code for wireless communication at a first network entity, the code comprising instructions executable by a processor to perform a method of any of aspects 24 through 26.

Aspect 37: An apparatus for wireless communication, comprising a processor; memory coupled with the processor; and instructions stored in the memory and executable by the processor to cause the apparatus to perform a method of any of aspects 27 through 27.

Aspect 38: An apparatus for wireless communication, comprising at least one means for performing a method of any of aspects 27 through 27.

Aspect 39: A non-transitory computer-readable medium storing code for wireless communication, the code comprising instructions executable by a processor to perform a method of any of aspects 27 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first network entity, comprising:
    one or more processors;
    memory coupled with the one or more processors; and
    instructions stored in the memory and executable by the one or more processors to cause the apparatus to:
        transmit a request for resources for the first network entity to monitor for one or more first reference signals from a second network entity, the first network entity and the second network entity each configured to provide communications for one or more user equipment (UEs), wherein the first network entity comprises a static network entity and the second network entity comprises a mobile network entity, the first network entity comprises a mobile network entity and the second network entity comprises a static network entity, or the first network entity and the second network entity comprise mobile network entities;
        monitor for the one or more first reference signals on the resources in response to transmitting the request;
        perform interference measurement of the resources based at least in part on the monitoring; and
        transmit a report of the interference measurement.

2. The apparatus of claim 1, wherein the instructions to transmit the request for resources are executable by the one or more processors to cause the apparatus to:
    transmit a request for the second network entity to transmit the one or more first reference signals on the resources using a plurality of beams.

3. The apparatus of claim 1, wherein the instructions to transmit the request for resources are executable by the one or more processors to cause the apparatus to:
    transmit a request for the second network entity to transmit the one or more first reference signals on the resources for reception at the first network entity using a plurality of beams.

4. The apparatus of claim 1, wherein the instructions are further executable by the one or more processors to cause the apparatus to:
    receive an indication of periodic resources to monitor for one or more second reference signals from the second network entity;
    receive the one or more second reference signals on the periodic resources; and
    perform interference measurement on the one or more second reference signals.

5. The apparatus of claim 4, wherein the instructions are further executable by the one or more processors to cause the apparatus to:
    receive an indication to perform the interference measurement on the one or more second reference signals received on the periodic resources based at least in part on the second network entity being within a threshold distance of the first network entity, wherein performing the interference measurement is based at least in part on receiving the indication.

6. The apparatus of claim 4, wherein the instructions are further executable by the one or more processors to cause the apparatus to:
    receive an indication to avoid performing subsequent interference measurement on the one or more second reference signals received on the periodic resources based at least in part on the second network entity being outside a threshold distance of the first network entity.

7. The apparatus of claim 4, wherein the instructions are further executable by the one or more processors to cause the apparatus to:
    transmit, in the request for resources and based at least in part on the interference measurement performed on the one or more second reference signals, an indication of one or more beams for the second network entity to use to transmit the one or more first reference signals.

8. The apparatus of claim 7, wherein the instructions are further executable by the one or more processors to cause the apparatus to:
    identify the one or more beams based at least in part on the interference measurement performed on the one or more second reference signals transmitted on the one or more beams satisfying a threshold.

9. The apparatus of claim 1, wherein the instructions are further executable by the one or more processors to cause the apparatus to:
    receive an indication for the first network entity to switch from connecting to a first donor node to connecting to a second donor node based at least in part on the report of the interference measurement.

10. The apparatus of claim 1, wherein the instructions are further executable by the one or more processors to cause the apparatus to:
    receive, from a third network entity, a control message scheduling communication at the first network entity based at least in part on the report of the interference measurement.

11. The apparatus of claim 1, wherein the instructions are further executable by the one or more processors to cause the apparatus to:
    schedule communication at the first network entity based at least in part on the interference measurement.

12. The apparatus of claim 1, wherein the resources requested by the first network entity comprises periodic resources, aperiodic resources, or semi-persistent resources.

13. An apparatus for wireless communication, comprising:
one or more processors;
memory coupled with the one or more processors; and
instructions stored in the memory and executable by the one or more processors to cause the apparatus to:
receive a request for resources for a first network entity to monitor for one or more first reference signals from a second network entity, the first network entity and the second network entity each configured to provide communications for one or more user equipment (UEs), wherein the first network entity comprises a static network entity and the second network entity comprises a mobile network entity, the first network entity comprises a mobile network entity and the second network entity comprises a static network entity, or the first network entity and the second network entity comprise mobile network entities;
transmit an indication of the resources for the first network entity to monitor for the one or more first reference signals from the second network entity; and
receive, based at least in part on transmitting the indication of the resources, a report of interference measurement performed by the first network entity on the one or more first reference signals.

14. The apparatus of claim 13, wherein the instructions to receive the request for resources are executable by the one or more processors to cause the apparatus to:
receive a request for the second network entity to transmit the one or more first reference signals on the resources using a plurality of beams.

15. The apparatus of claim 13, wherein the instructions to receive the request for resources are executable by the one or more processors to cause the apparatus to:
receive a request for the second network entity to transmit the one or more first reference signals on the resources for reception at the first network entity using a plurality of beams.

16. The apparatus of claim 13, wherein the instructions are further executable by the one or more processors to cause the apparatus to:
transmit an indication of periodic resources for the first network entity to monitor for one or more second reference signals from the second network entity; and
receive, based at least in part on transmitting the indication of periodic resources, a second report of interference measurement performed by the first network entity on the one or more second reference signals.

17. The apparatus of claim 16, wherein the instructions are further executable by the one or more processors to cause the apparatus to:
receive, in the request for resources and based at least in part on the interference measurement performed on the one or more second reference signals, an indication of one or more beams for the second network entity to use to transmit the one or more first reference signals.

18. The apparatus of claim 13, wherein the instructions are further executable by the one or more processors to cause the apparatus to:
transmit an indication for the first network entity to switch from connecting to a first donor node to connecting to a second donor node based at least in part on the report of the interference measurement.

19. The apparatus of claim 13, wherein the instructions are further executable by the one or more processors to cause the apparatus to:
transmit a control message scheduling communication at the first network entity based at least in part on the report of the interference measurement.

20. The apparatus of claim 13, wherein the instructions are further executable by the one or more processors to cause the apparatus to:
schedule communication at another network entity based at least in part on the interference measurement.

21. The apparatus of claim 13, wherein the resources requested by the first network entity comprises periodic resources, aperiodic resources, or semi-persistent resources.

22. An apparatus for wireless communication at a first network entity, comprising:
one or more processor;
memory coupled with the one or more processors; and
instructions stored in the memory and executable by the one or more processors to cause the apparatus to:
receive an indication of aperiodic resources for the first network entity to monitor for one or more reference signals from a second network entity, the first network entity and the second network entity each configured to provide communications for one or more user equipment (UEs), wherein the first network entity comprises a static network entity and the second network entity comprises a mobile network entity, the first network entity comprises a mobile network entity and the second network entity comprises a static network entity, or the first network entity and the second network entity comprise mobile network entities;
monitor for the one or more reference signals on the aperiodic resources;
perform interference measurement of the aperiodic resources based at least in part on the monitoring; and
transmit a report of the interference measurement.

23. The apparatus of claim 22, wherein the instructions are further executable by the one or more processors to cause the apparatus to:
receive, from a third network entity, a control message scheduling communication at the first network entity based at least in part on the report of the interference measurement.

24. The apparatus of claim 22, wherein the instructions are further executable by the one or more processors to cause the apparatus to:
schedule communication at the first network entity based at least in part on the interference measurement.

25. An apparatus for wireless communication, comprising:
one or more processor;
memory coupled with the one or more processors; and
instructions stored in the memory and executable by the one or more processors to cause the apparatus to:
transmit an indication of aperiodic resources for a first network entity to monitor for one or more reference signals from a second network entity, the first network entity and the second network entity each configured to provide communications for one or more user equipment (UEs), wherein the first network entity comprises a static network entity and the second network entity comprises a mobile network entity, the first network entity comprises a mobile network entity and the second network entity comprises a static network entity, or the first network entity and the second network entity comprise mobile network entities;

receive a report of interference measurement performed by the first network entity on the one or more reference signals received from the second network entity; and schedule communication at the first network entity or another network entity based at least in part on the report of the interference measurement.

* * * * *